(12) United States Patent
Yang et al.

(10) Patent No.: US 11,722,257 B2
(45) Date of Patent: *Aug. 8, 2023

(54) HYBRID AUTOMATIC REPEAT REQUEST-ACKNOWLEDGEMENT (HARQ-ACK) HISTORY FEEDBACK CHANNEL

(71) Applicant: QUALCOMM INCORPORATED, San Diego, CA (US)

(72) Inventors: Wei Yang, San Diego, CA (US); Wanshi Chen, San Diego, CA (US); Yi Huang, San Diego, CA (US); Heechoon Lee, San Diego, CA (US); Tingfang Ji, San Diego, CA (US); Peter Gaal, San Diego, CA (US); Jing Jiang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/453,174

(22) Filed: Nov. 1, 2021

(65) Prior Publication Data

US 2022/0052791 A1 Feb. 17, 2022

Related U.S. Application Data

(63) Continuation of application No. 16/535,986, filed on Aug. 8, 2019, now Pat. No. 11,196,514.

(Continued)

(51) Int. Cl.
*H04L 1/18* (2023.01)
*H04L 1/1812* (2023.01)
*H04L 5/00* (2006.01)

(52) U.S. Cl.
CPC .......... *H04L 1/1812* (2013.01); *H04L 5/0055* (2013.01)

(58) Field of Classification Search
None
See application file for complete search history.

(56) References Cited

U.S. PATENT DOCUMENTS

2009/0129317 A1* 5/2009 Che ................. H04L 1/1671 370/328
2010/0050041 A1 2/2010 Chang et al.
(Continued)

FOREIGN PATENT DOCUMENTS

| EP | 3301850 A1 | 4/2018 |
| WO | 0232039 A2 | 4/2002 |
| WO | 2012030541 A1 | 3/2012 |

OTHER PUBLICATIONS

International Search Report and Written Opinion—PCT/US2019/045876—ISA/EPO—dated Oct. 24, 2019.

*Primary Examiner* — Hassan A Phillips
*Assistant Examiner* — Gautam Sharma
(74) *Attorney, Agent, or Firm* — Haynes and Boone, LLP; Kevin T. Cheatham

(57) ABSTRACT

Wireless communications systems and methods related to hybrid automatic repeat request (HARQ) history feedbacks are provided. A user equipment (UE) receives one or more data blocks of a plurality of data blocks, each of the one or more data blocks received in one of a plurality of transmission occasions. The UE transmits an individual feedback for each of the one or more data blocks indicating whether the data block is received successfully. The UE transmits a feedback history report for one or more transmission occasions of the plurality of transmission occasions.

45 Claims, 16 Drawing Sheets

Related U.S. Application Data

(60) Provisional application No. 62/764,948, filed on Aug. 17, 2018, provisional application No. 62/717,608, filed on Aug. 10, 2018.

(56) References Cited

U.S. PATENT DOCUMENTS

| | | | |
|---|---|---|---|
| 2010/0172428 A1* | 7/2010 | Pani | H04L 1/0026 375/262 |
| 2011/0055653 A1* | 3/2011 | Shirani-Mehr | H04L 1/1861 714/748 |
| 2014/0293884 A1* | 10/2014 | Larsson | H04L 1/0073 370/329 |
| 2017/0251430 A1* | 8/2017 | Fazel Sarjoui | H04W 52/0212 |
| 2018/0097606 A1 | 4/2018 | Toledano et al. | |
| 2020/0052831 A1 | 2/2020 | Yang et al. | |
| 2020/0195386 A1 | 6/2020 | Marinier et al. | |

* cited by examiner

HYBRID AUTOMATIC REPEAT REQUEST-ACKNOWLEDGEMENT (HARQ-ACK) HISTORY FEEDBACK CHANNEL

CROSS REFERENCE TO RELATED APPLICATIONS

The present application is a continuation of U.S. patent application Ser. No. 16/535,986, filed Aug. 8, 2019, which claims priority to and the benefit of U.S. Provisional Patent Application No. 62/764,948, filed Aug. 17, 2018, and of U.S. Provisional Patent Application No. 62/717,608, filed Aug. 10, 2018, each of which is hereby incorporated by reference in its entirety as if fully set forth below and for all applicable purposes.

TECHNICAL FIELD

The application technology discussed below relates to wireless communication systems, and more particularly to hybrid automatic repeat request (HARQ) history feedbacks. Certain embodiments enable and provide solutions and techniques to improve HARQ communication reliability.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to providing a high-reliability communication is to apply HARQ techniques. For example, a BS may transmit a downlink (DL) transmission to a UE and the UE may provide the BS with a reception status of the DL transmission. If the UE receives the DL transmission successfully, the UE may transmit a HARQ-acknowledgement (HARQ-ACK) to the BS. Conversely, if the UE fails to receive the DL transmission successfully, the UE may transmit a HARQ-negative-acknowledgement (HARQ-NACK) to the BS. Upon receiving a HARQ-NACK from the UE, the BS may retransmit the DL transmission. The BS may retransmit the DL transmission until a HARQ-ACK is received from the UE or reaching a certain retransmission limit.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for improving HARQ communication reliability. For example, a base station (BS) may configure a user equipment (UE) to provide HARQ feedback history information. The BS may transmit a plurality of DL communications to the UE during a plurality of transmission occasions. The UE may transmit an individual HARQ acknowledgment/negative acknowledgement (ACK/NACK) feedback for each received DL communication to the BS. Additionally, the UE may transmit HARQ feedback history information associated with one or more transmission occasions of the plurality of transmission occasions to the BS to assist the BS in detecting and/or recovering mis-detected HARQ feedbacks.

For example, in an aspect of the disclosure, a method of wireless communication includes receiving, by the UE, one or more data blocks, each of the one or more data blocks received in one of a plurality transmission occasions. The method further includes transmitting, by the UE, an individual feedback for each of the one or more data blocks indicating whether the data block is received successfully. The method further includes transmitting, by the UE, a feedback history report for one or more transmission occasions of the plurality of transmission occasions.

In an additional aspect of the disclosure, a method of wireless communication includes transmitting, by a BS to a UE, a plurality of data blocks during a plurality of transmission occasions. The method further includes receiving, by the BS from the UE, an individual feedback for at least a first data block of the plurality of data blocks, the individual feedback indicating whether the first data block is received successfully. The method further includes receiving, by the BS from the UE, a feedback history report for one or more transmission occasions of the plurality of transmission occasions.

In an additional aspect of the disclosure, a UE includes a transceiver configured to receive one or more data blocks, each of the one or more data blocks received in one of a plurality of transmission occasions. The transceiver is further configured to transmit an individual feedback for each of the one or more data blocks indicating whether the data block is received successfully. The transceiver is further configured to transmit a feedback history report for one or more transmission occasions of the plurality of transmission occasions.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
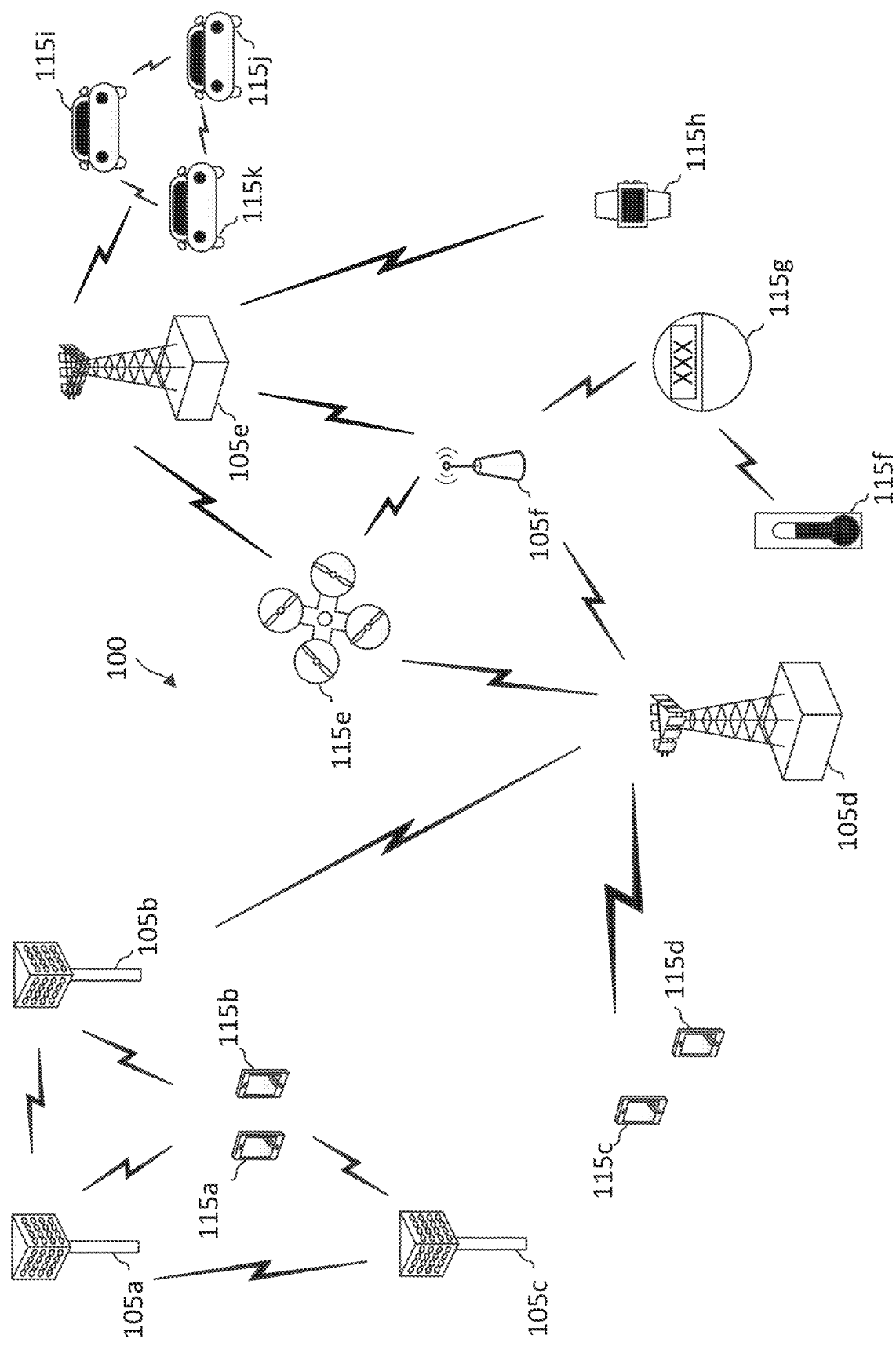
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for improving HARQ communication reliability by configuring a UE to provide HARQ feedback history information. For example, a BS may configure the UE with a plurality of transmission occasions. The UE may monitor for DL communications from the BS based on the transmission occasions. Upon receiving a DL communication from the monitoring, the UE transmits an individual HARQ feedback (e.g., an acknowledgement (ACK) or a negative-acknowledgement (NACK)) for the DL communication. The UE may generate a NACK for a transmission occasion when the UE does not receive any DL communication for the transmission occasion. The UE may record each individual feedback for each of the plurality of transmission occasion. Additionally, the UE may transmit a HARQ feedback history report for one or more transmission occasions of the plurality of transmission occasions. In some instances, the BS may mis-detect or misinterpret a HARQ feedback from the UE due to various errors (e.g., channel errors). The HARQ feedback history report can assist the BS in detecting and/or recovering HARQ ACK/NACK feedback misdetection or misinterpretation.

In an embodiment, the BS can configure the UE to provide a feedback history report periodically, via a semi-static configuration. In an embodiment, the BS can dynamically trigger the UE to transmit a feedback history report. In an embodiment, the UE is configured to include individual HARQ feedbacks for all transmission occasions within a reporting period in a feedback history report. In an embodiment, the UE is configured to include individual HARQ feedbacks for a subset of the transmission occasion within a reporting period in a feedback history report. In an embodiment, the BS may request the UE to provide an aggregated decoding result for multiple transmission occasions within a reporting period. In an embodiment, the BS may repeat the transmission of a DL communication over multiple component carriers and/or via multiple transmission reception points (TRPs) and may request the UE to provide the feedback history report for a certain component carrier and/or a certain TRP. In an embodiment, the BS may communicate DL communications for a plurality of services (e.g., an enhanced mobile broadband (eMBB) service and a URLLC service) with the UE and may request the UE to provide the feedback history report for a certain service. In an embodiment, the BS may communicate DL communications of different HARQ processes with the UE and may request the UE to provide a feedback history report for a certain HARQ process.

Aspects of the present application can provide several benefits. For example, the reporting of HARQ feedback history in addition to the individual HARQ ACK/NACK feedbacks can allow the BS to detect and recover individual HARQ feedback that were previously misdetected or misinterpreted by the BS. Accordingly, the present disclosure can improve HARQ communication reliability. The reporting of HARQ feedback history on a per component carrier basis and/or per TRP basis can assist the BS in performing outer-loop tracking on a per component carrier basis and/or per TRP basis. Accordingly, the present disclosure can improve outer-loop tracking performance. The selective reporting of HARQ feedback history on a service basis can assist the BS in detecting and/or recovering traffic collisions. Accordingly, the present disclosure can provide transmission recovery due to collision.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (HD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. In some embodiments, the BS 105 may communicate data with the UE 115 using HARQ to improve communication reliability.

In an embodiment, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the component carrier to a UE 115 for UL and DL communications. For example, the BWP pair may include one BWP for UL communications and one BWP for DL communications.

In an embodiment, the BS 105 may communicate with a UE 115 using HARQ techniques to improve communication reliability, for example, to provide a URLLC service with a reliability requirement of about 1e-6. The BS 105 may schedule a UE 115 for a PDSCH communication by transmitting a DL grant in a PDCCH. The BS 105 may transmit a DL data packet to the UE 115 according to the schedule in the PDSCH. If the UE 115 receives the DL data packet successfully, the UE 115 may transmit a HARQ-ACK to the BS 105. Conversely, if the UE 115 fails to receive the DL transmission successfully, the UE 115 may transmit a HARQ-negative-acknowledgement (HARQ-NACK) to the BS 105. In some examples, the BS 105 may schedule the UE 115 to transmit the HARQ feedback in a PUCCH. In some examples, the BS 105 may schedule the UE 115 to transmit the HARQ feedback in a PUSCH. Upon receiving a HARQ-ACK from the UE 115 for the DL data packet, the BS 105 may subsequently transmit a new DL data packet to the UE 115. However, upon receiving a HARQ-NACK from the UE 115 for the DL data packet, the BS 105 may retransmit the DL data packet to the UE 115. According to embodiments of the disclosure, the UE 115 may additionally provide the BS 105 with information associated with a history of HARQ-ACK feedbacks that were sent to the BS 105 to further facilitate and improve HARQ processing at the BS 105. Mechanisms for providing HARQ-ACK feedback history information are described in greater detail herein.

Figure 2:
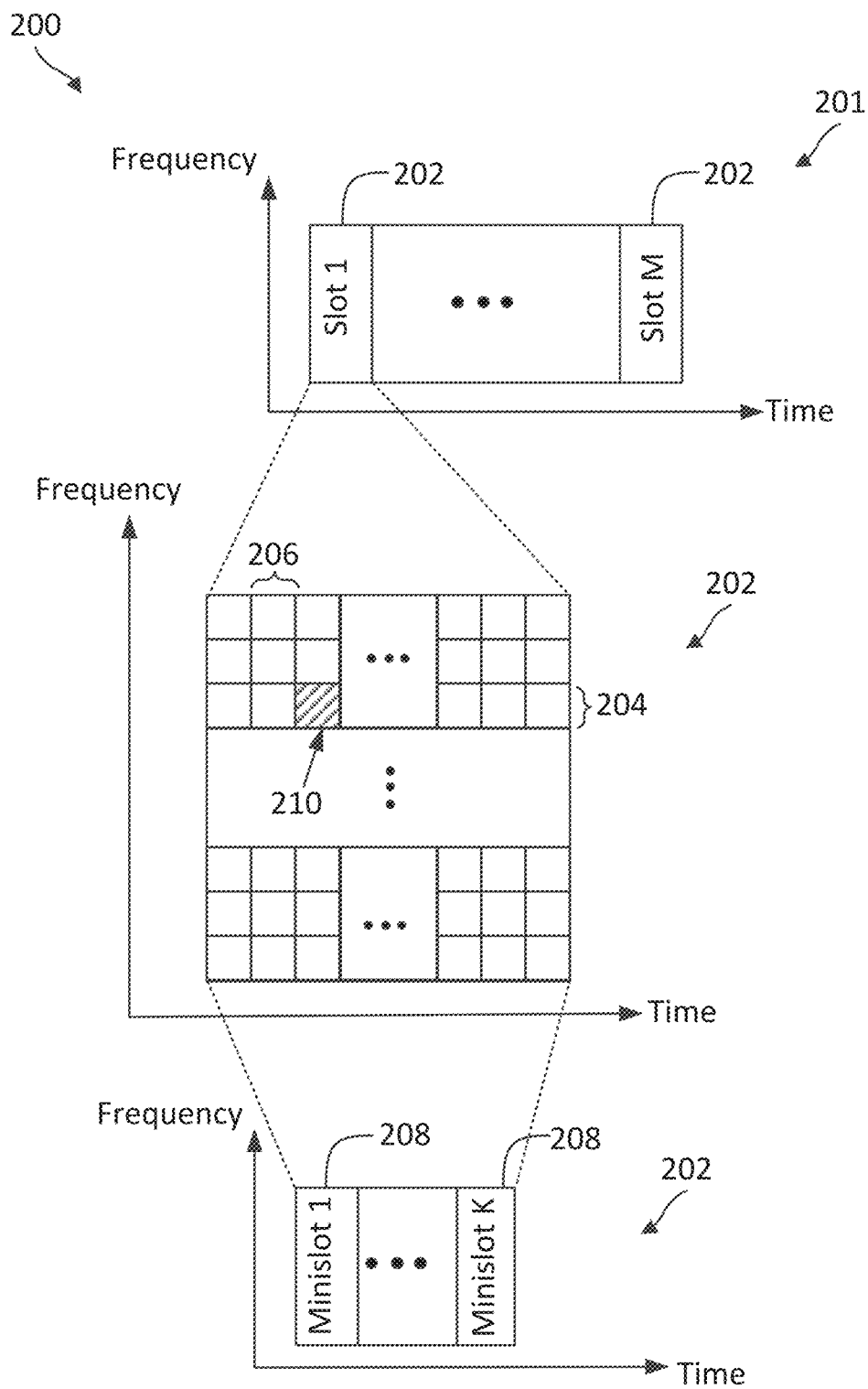
FIG. 2 is a timing diagram illustrating a transmission frame structure according to some embodiments of the present disclosure.

FIG. 2 is a timing diagram illustrating a transmission frame structure 200 according to some embodiments of the present disclosure. The transmission frame structure 200 may be employed by BSs such as the BSs 105 and UEs such as the UEs 115 in a network such as the network 100 for communications. In particular, the BS may communicate with the UE using time-frequency resources configured as shown in the transmission frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the embodiments. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the embodiments, for example, based on the channel bandwidth, the subcarrier spacing (SCS), and/or the CP mode. One subcarrier 204 in frequency and one symbol 206 in time forms one resource element (RE) 210 for transmission.

A BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some embodiments, a mini-slot 208 may have a length of about two symbols 206, about four symbols 206, or about seven symbols 206.

Figure 3:
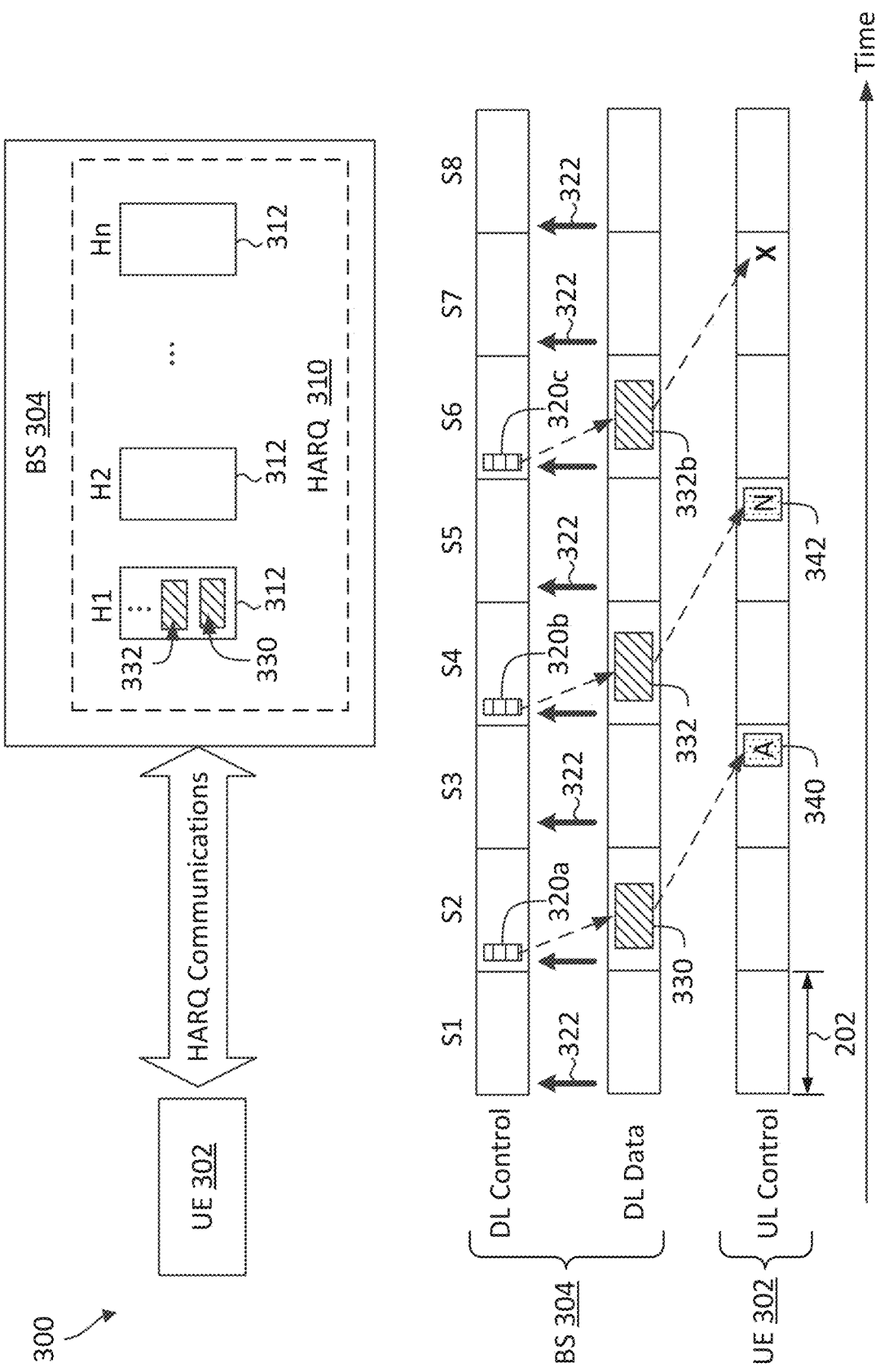
FIG. 3 illustrates a hybrid automatic repeat request (HARQ) communication scenario according to some embodiments of the present disclosure.

FIG. 3 illustrates a HARQ communication scenario 300 according to some embodiments of the present disclosure. The scenario 300 may correspond to a HARQ communication scenario in the network 100. In FIG. 3, the x-axis represents time in some arbitrary units. The scenario 300 is described using a substantially similar transmission frame structure as FIG. 2, and may use the same reference numerals as in FIG. 2 for simplicity sake.

In the scenario 300, a BS 304 (e.g., the BSs 105) may communicate DL data with a UE 302 (e.g., the UEs 115) using HARQ. For HARQ communications, a transmitting node (e.g., the BS 304) may transmit data to a receiving node (e.g., the BS 304). The receiving node may provide the transmitting node with a feedback on the reception status of the data. For example, the receiving node may transmit an ACK to the transmitting node to indicate a successful decoding of the data. Conversely, the receiving node may transmit a NACK to the transmitting node to indicate a decoding failure for the data. When the transmitting node receives an ACK from the receiving node, the transmitting node may transmit new data in a subsequent transmission. However, when the transmitting node receives a NACK from the receiving node, the transmitting node may retransmit the same data to the receiving node. In an example, the transmitting node may transmit the same encoding version of the data in the initial transmission and the retransmission. In an example, the transmitting node may transmit different encoding versions of the data in the initial transmission and the retransmission. In an example, the receiving node may apply soft-combining to combine the encoded data received from the initial transmission and the retransmission for decoding. For simplicity of discussion and illustration, FIG. 3 illustrates the HARQ communication in the context of DL data communications, though similar HARQ mechanisms may be applied to UL data communications.

In an example, the BS 304 includes a HARQ component 310. The HARQ component 310 is configured to perform multiple parallel HARQ processes 312 for DL data communications. The HARQ processes 312 may operate independent of each other. In other words, the ACKs, NACKs, and/or retransmissions are determined and processed separately for each HARQ process at the BS 304 and at the UE 302. Each HARQ process 312 may be identified by a HARQ process ID. For example, the HARQ processes 312 may be identified by identifiers H1, H2, Hn. The BS 304 may communicate with the UE 302 in units of slots 202. The slots 202 are shown as S1, S2, . . . , S8. The BS 304 may configure the UE 302 with a plurality of potential transmission occasions 322 (e.g., PDSCH transmission occasions) in the slots 202. In other words, the BS 304 may potentially transmit a DL communication signal to the UE 302 in each of the transmission occasions 322. Accordingly, the UE 302 may monitor for a DL transmission from the BS 304 in each transmission occasion 322.

For purposes of simplicity of discussion, FIG. 3 illustrates HARQ transmissions for one HARQ process H1 312, though it will be recognized that embodiments of the present disclosure may scale to many more HARQ processes 312 (e.g., 2, 3, to 16). As shown, the BS 304 transmits a scheduling grant 320a in the slot S2 202 (e.g., via a PDCCH). The scheduling grant 320a may be transmitted as a PDCCH DCI. The scheduling grant 320a indicates a schedule for a data block 330 (e.g., PDSCH data) in the slot S2 202. In some examples, the scheduling grant 320a may additionally indicate a resource (e.g., in the slot S3 202) for transmitting a HARQ feedback for the data block 330. Subsequently, the BS 304 transmits the data block 330 (e.g., via a PDSCH) according to the schedule. The data block 330 may be in the form of a transport block (TB). A TB may include an encoded media access control (MAC) layer packet data unit (PDU) including information bits. For example, the UE 302 receives and decodes the data block 330 successfully. Thus, the UE 302 transmits an ACK 340 (marked as A) to the BS 304 in the slot S3 202 to indicate a successful decoding of the data block 330.

After receiving the ACK 340, the BS 304 transmits a scheduling grant 320b to schedule the UE 302 for a new data block 332 in the slot S4 202. The scheduling grant 320b may additionally indicate a resource in the slot S5 202 for transmitting a HARQ feedback for the data block 332. For example, the UE 302 receives the data block 332, but fails to decode the data block 332. Thus, the UE 302 transmits a NACK 342 (marked as N), for example, in the slot S5 202, to indicate a reception failure of the data block 332.

Upon receiving the NACK 342, the BS 304 transmits a scheduling grant 320c to schedule the UE 302 for a retransmission of the data block 332 in the slot S6 202. The BS 304 retransmits the data block 332 in the slot S6 202. The retransmitted data block 332 is shown as 332b. In some examples, the retransmitted data block 332b may be identical to the initial data block 332. In some examples, the retransmitted data block 332b may carry the same information bits as the initial data block 332, but may include a different encoded version than the initial data block 332. The UE 302 fails to detect the scheduling grant 320c, and thus may not transmits any ACK or NACK for the data block 332b (shown by cross symbol in the slot S7 202). When no ACK or NACK is received for the data block 332b, the BS 304 may again retransmit the data block 332. The BS 304 may retransmit the data block 332 multiple times until the UE 302 receives the data block 332 correctly or when reaching a certain retransmission limit.

As can be observed from the scenario 300, DL communication errors (where the UE 302 fails to detect and/or decode a PDCCH or a PDSCH) can be corrected through HARQ retransmission. However, the DL communication reliability may also rely on UL communication reliability, which may not be corrected by HARQ as shown in FIG. 4 below.

Figure 4:
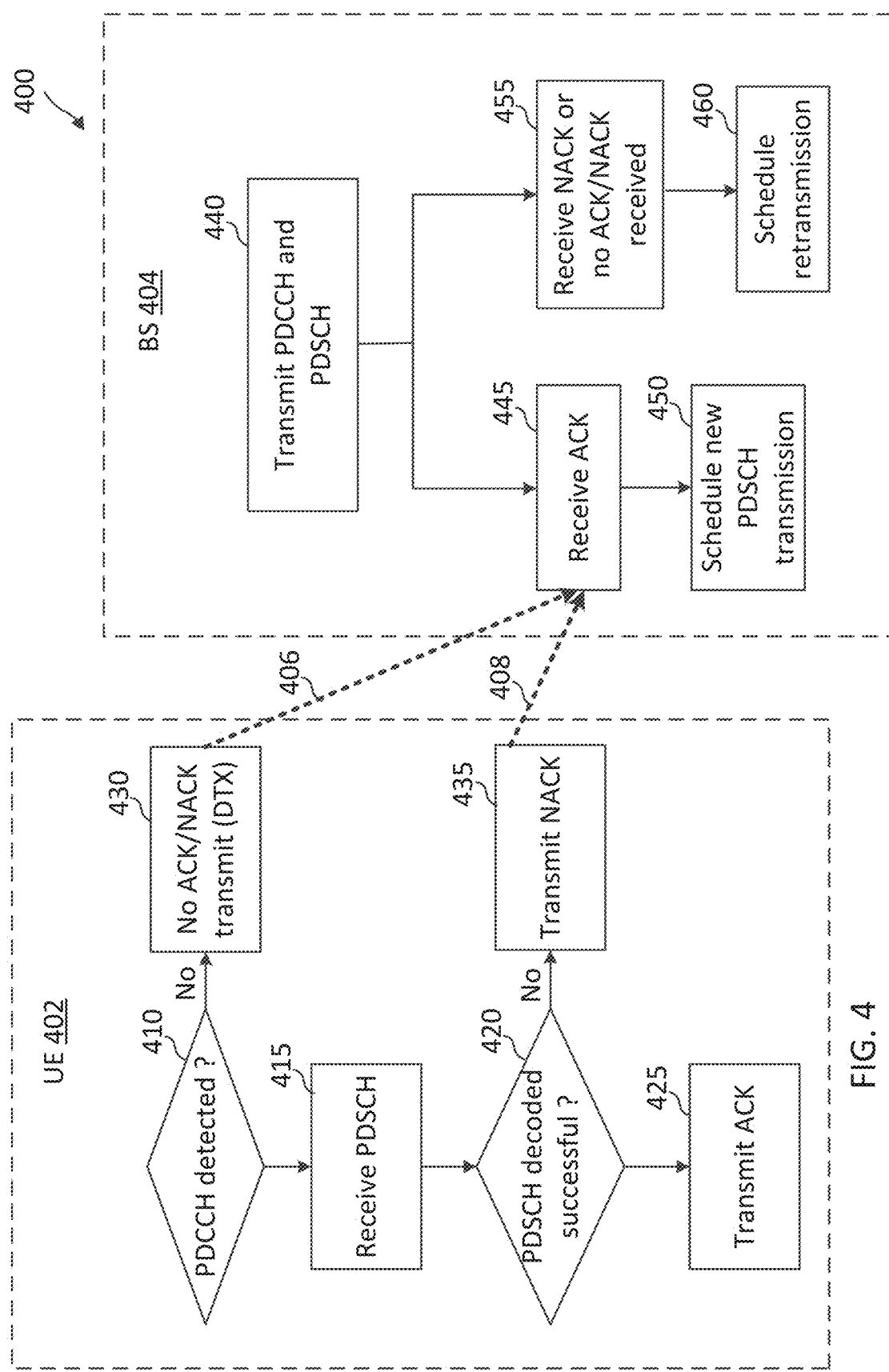
FIG. 4 illustrates a HARQ processing scenario according to some embodiments of the present disclosure.

FIG. 4 illustrates a HARQ processing scenario 400 according to some embodiments of the present disclosure. The scenario 400 may correspond to a HARQ communication scenario in the network 100. The scenario 400 illustrates HARQ processing at a UE 402 (e.g., the UEs 115 and/or 302) and at a BS 404 (e.g., the BSs 105 and/or 304). The BS 404 may configure the UE 402 with transmission occasions (e.g., the transmission occasions 322). The UE 402 may monitor for a DL transmission from the BS 404 according to the transmission occasions.

The HARQ processing at the BS 404 is shown on the right-side of FIG. 4. At step 440, the BS 404 transmits a PDCCH signal and a PDSCH signal. The PDCCH signal may carry a scheduling grant (e.g., the scheduling grants 320) for the PDSCH signal. The PDSCH signal may carry DL data (e.g., the data blocks 330 and 332). The BS 404 may monitor for a feedback from the BS 404. At step 445, the BS 404 detects an ACK (e.g., the ACK 340) from the UE 402. At step 450, after detecting an ACK, the BS 404 schedules a new PDSCH transmission. Alternatively, at step 455, the BS 404 detects a NACK (e.g., the NACK 342) from the UE 402. At step 460, after detecting a NACK, the BS 404 schedules a retransmission of the PDSCH signal.

The HARQ processing at the UE 402 is shown on the left-side of FIG. 4. At step 410, the UE 402 determines whether a PDCCH (e.g., a scheduling grant 320) is detected from the BS 404 during a transmission occasion. When no PDCCH is detected, the UE 402 does not transmit any ACK/NACK to the BS 404 as shown by the step 430 and may be referred to as discontinuous transmission (DTX). Otherwise, the UE 402 proceeds to step 415. At step 415, the UE 402 receives a PDSCH transmission as scheduled by the PDCCH. At step 420, the UE 402 determines whether the PDSCH transmission is decoded successfully. When the PDSCH transmission is successfully decoded, the UE 402 proceeds to step 425. At step 425, the UE 402 transmits an ACK (e.g., the ACK 340) indicating that the PDSCH transmission is successfully decoded. When the PDSCH transmission is not successfully decoded, the UE 402 proceeds to step 435. At step 435, the UE 402 transmits a NACK (e.g., the NACK 342) indicating that the decoding of the PDSCH transmission fails.

Two types of UL error events may occur at the BS 404. The first type of UL error is a DTX-to-ACK error (shown by the dashed arrow 406), where the BS 404 erroneously detects an ACK when the UE 402 did not transmit any ACK/NACK feedback due to an undetected PDCCH error. The second type of UL error is a NACK to ACK error (shown by the dashed arrow 408), where the UE 402 transmits a NACK, but the BS 404 mis-detects the NACK as an ACK. As can be observed from the scenario 400, when a UL DTX-to-ACK error or a UL NACK-to-ACK occurs, the BS 404 may simply proceed to a new PDSCH transmission, leaving the UE 402 with a PDSCH error.

Accordingly, the present disclosure provides techniques for a UE (e.g., the UEs 115, 302, and/or 402) to provide ACK/NACK history information to a BS (e.g., the BSs 105, 304, and/or 404), for example, via a ACK/NACK history feedback channel. The ACK/NACK history may assist the BS to detect and/or recover UL errors, such as DTX-to-ACK errors and NACK-to-ACK errors, that may occur in HARQ communications.

Figure 5:
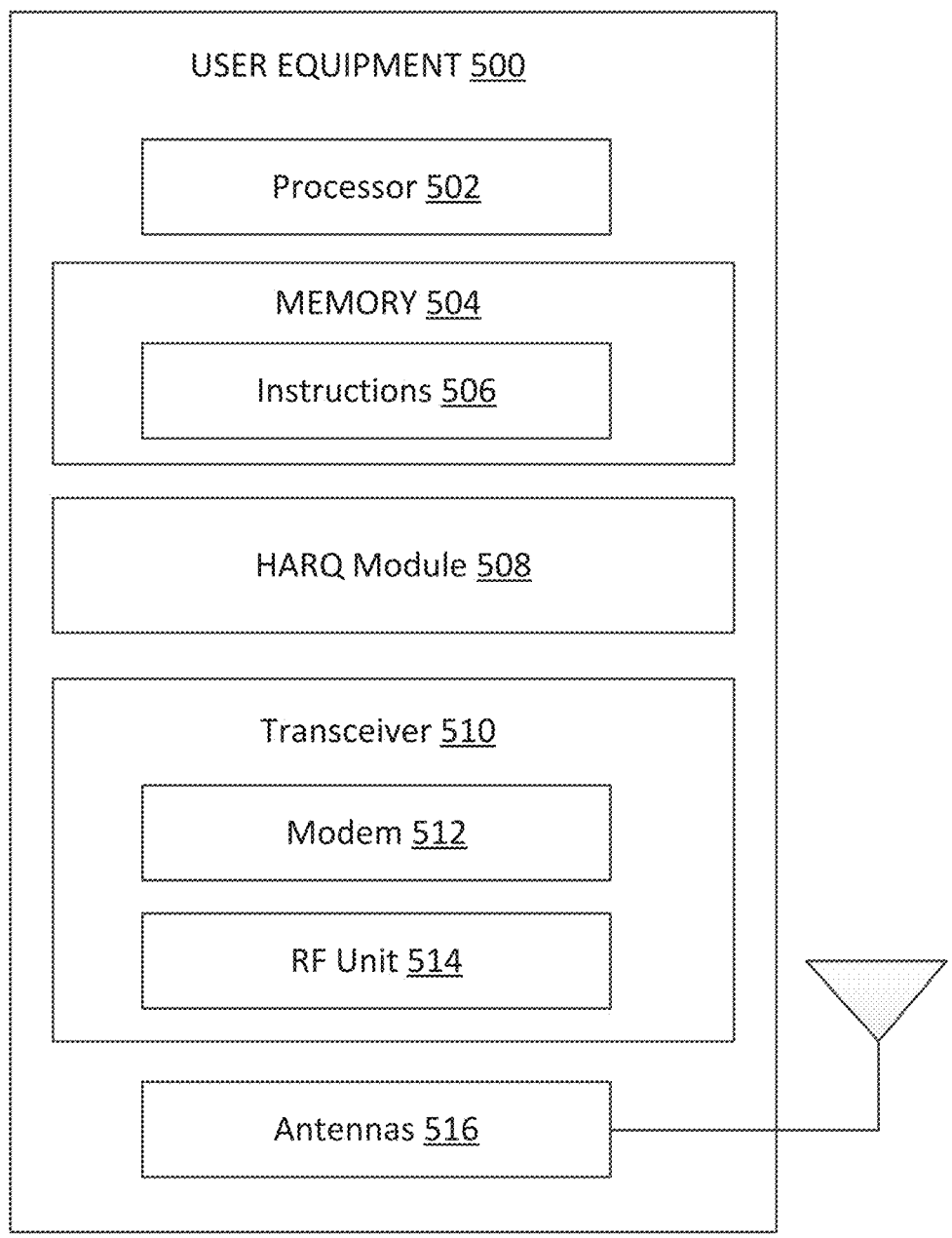
FIG. 5 is a block diagram of a user equipment (UE) according to some embodiments of the present disclosure.

FIG. 5 is a block diagram of an exemplary UE 500 according to embodiments of the present disclosure. The UE 500 may be a UE 115, a UE 302, or a UE 402 discussed above in FIGS. 1, 3, 4, respectively. As shown, the UE 500 may include a processor 502, a memory 504, a HARQ module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with embodiments of the present disclosure, for example, aspects of FIGS. 7-16. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The HARQ module 508 may be implemented via hardware, software, or combinations thereof. For example, the HARQ module 508 may be implemented as a processor, circuit, and/or instructions 506 stored in the memory 504 and executed by the processor 502. In some examples, the HARQ module 508 can be integrated within the modem subsystem 512. For example, HARQ module 508 can be implemented by a combination of software components (e.g., executed by a DSP or a general processor) and hardware components (e.g., logic gates and circuitry) within the modem subsystem 512.

The HARQ module 508 may be used for various aspects of the present disclosure, for example, aspects of FIGS. 7-16. The HARQ module 508 is configured to monitor for a plurality of data blocks (e.g., the data blocks 330 and 332) from a BS (e.g., the BSs 105, 304, and/or 404) during a plurality of transmission occasions (e.g., the transmission occasions 322), receive one or more data blocks of the plurality of data blocks based on the monitoring, transmit an individual HARQ ACK/NACK feedback for each received data block, generate a NACK for each transmission occasion with no data block detected, generate a record of feedback history including ACK/NACKs for the plurality of transmission occasions, and/or transmit a HARQ feedback history report for one or more transmission occasions of the plurality of transmission occasions to the BS.

In an embodiment, the HARQ module 508 is configured to receive a HARQ feedback history reporting configuration from the BS and transmit the HARQ feedback history report based on the configuration. The configuration may be a semi-static configuration or a dynamic configuration. In an embodiment, the configuration configures the UE 500 to include individual HARQ feedbacks for all transmission occasions within a reporting period in a feedback history report. In an embodiment, the configuration configures the UE 500 to include individual HARQ feedbacks for a subset of the transmission occasion within a reporting period in a feedback history report. In an embodiment, the configuration configures the UE 500 to provide an aggregated decoding result for multiple transmission occasions within a reporting period. In an embodiment, the BS may repeat the transmission of a data block over multiple component carriers and/or via multiple TRPs and the configuration request the UE 500 to provide the feedback history report for a certain component carrier and/or a certain TRP. In an embodiment, the BS may communicate DL communications for a plurality of services (e.g., an eMBB service and a URLLC service) with the UE 500 and the configuration may request the UE 500 to provide the feedback history report for a certain service. In an embodiment, the BS may communicate DL communications of different HARQ processes with the UE 500 and the configuration configures the UE 500 to provide a feedback history report for a certain HARQ process. Mechanisms for HARQ feedback history reporting are described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the HARQ module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., HARQ feedbacks, HARQ feedback history reports) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., DL data blocks, HARQ feedback history configuration) to the HARQ module 508 for processing. The antennas 516 may include multiple antennas of similar or different designs in order to sustain multiple transmission links. The RF unit 514 may configure the antennas 516.

In an example, the transceiver 510 is configured to receive a plurality of DL communications from a BS, transmit, to the BS, an individual HARQ feedbacks for each received DL communication, receive a HARQ feedback history configuration from the BS, and/or transmit a HARQ feedback history report to the BS based on the configuration, for example, by coordinating with the HARQ module 508.

In an embodiment, the UE 500 can include multiple transceivers 510 implementing different RATs (e.g., NR and LTE). In an embodiment, the UE 500 can include a single transceiver 510 implementing multiple RATs (e.g., NR and LTE). In an embodiment, the transceiver 510 can include various components, where different combinations of components can implement different RATs.

Figure 6:
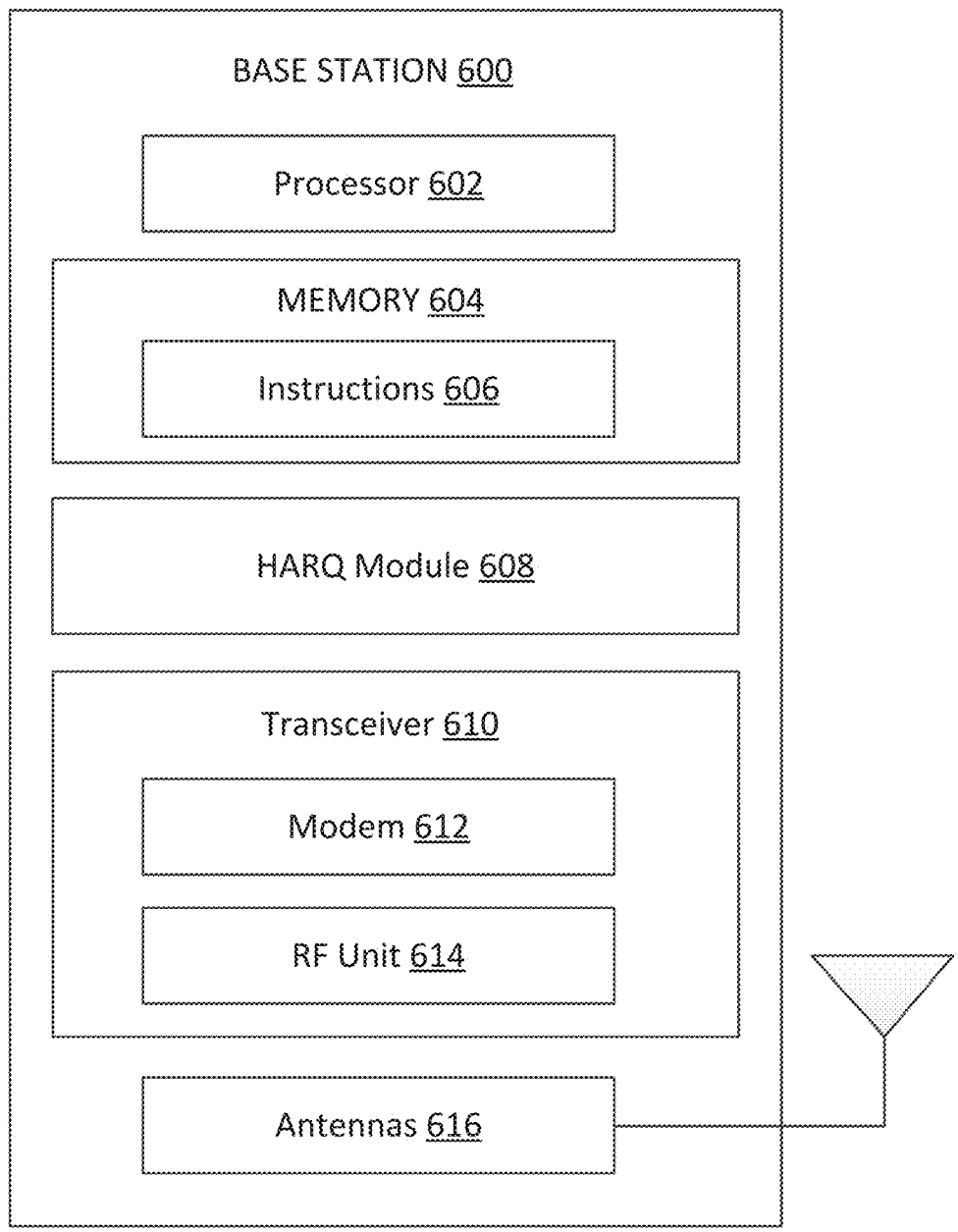
FIG. 6 is a block diagram of an exemplary base station (BS) according to some embodiments of the present disclosure.

FIG. 6 is a block diagram of an exemplary BS 600 according to embodiments of the present disclosure. The BS 600 may be a BS 105, BS 304, or BS 404 as discussed above in FIGS. 1, 3, and 4, respectively. As shown, the BS 600 may include a processor 602, a memory 604, a HARQ module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 76-16. Instructions 606 may also be referred to as code, which may be interpreted broadly to include any type of computer-readable statement(s) as discussed above with respect to FIG. 5.

The HARQ module 608 may be implemented via hardware, software, or combinations thereof. For example, the HARQ module 608 may be implemented as a processor, circuit, and/or instructions 606 stored in the memory 604 and executed by the processor 602. In some examples, the HARQ module 608 can be integrated within the modem subsystem 612. For example, HARQ module 608 can be implemented by a combination of software components (e.g., executed by a DSP or a general processor) and hardware components (e.g., logic gates and circuitry) within the modem subsystem 612.

The HARQ module 608 may be used for various aspects of the present disclosure, for example, aspects of FIGS. 7-16. The HARQ module 608 is configured to configure a UE (e.g., the UEs 115, 302, 402, and/or 500) with a plurality of transmission occasions (e.g., the transmission occasions 322), transmit a plurality of data blocks (e.g., the data blocks 330 and 332) to the UE during the plurality of transmission occasions, receive an individual HARQ ACK/NACK feedback for at least one of the data blocks, and/or receive a HARQ feedback history report for one or more transmission occasions of the plurality of transmission occasions from the UE.

In an embodiment, the HARQ module 608 is configured to transmit a HARQ feedback history reporting configuration to configure the UE for HARQ feedback history report transmission. The configuration may be a semi-static configuration or a dynamic configuration. In an embodiment, the configuration configures the UE to include individual HARQ feedbacks for all transmission occasions within a reporting period in a feedback history report. In an embodiment, the configuration configures the UE to include individual HARQ feedbacks for a subset of the transmission occasion within a reporting period in a feedback history report. In an embodiment, the configuration configures the UE to provide an aggregated decoding result for multiple transmission occasions within a reporting period. In an embodiment, the BS 600 may repeat the transmission of a data block over multiple component carriers and/or via multiple TRPs and the configuration request the UE to provide the feedback history report for a certain component carrier and/or a certain TRP. In an embodiment, the BS may communicate DL communications for a plurality of services (e.g., an eMBB service and a URLLC service) with the UE and the configuration may request the UE 500 to provide the feedback history report for a certain service. In an embodiment, the BS 600 may communicate DL communications of different HARQ processes with the UE and the configuration configures the UE to provide a feedback history report for a certain HARQ process. Mechanisms for HARQ feedback history reporting are described in greater detail herein.

As shown, the transceiver 610 may include the modem subsystem 612 and the RF unit 614. The transceiver 610 can be configured to communicate bi-directionally with other devices, such as the UEs 115, 302, 302, and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., a multi-grant scheduling grant) from the modem subsystem 612 (on outbound transmissions) or of transmissions originating from another source such as a UE 115, 302, or 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115, 302, or 500 according to embodiments of the present disclosure. The antennas 616 may further receive data messages transmitted from other devices and provide the received data messages for processing and/or demodulation at the transceiver 610. The transceiver 610 may provide the demodulated and decoded data (e.g., HARQ feedbacks) to the HARQ module 608 for processing. The antennas 616 may include multiple antennas of similar or different designs in order to sustain multiple transmission links.

In an example, the transceiver 610 is configured to transmit a plurality of DL communications to a UE, receive one or more individual HARQ feedbacks for one or more of the DL communication from the UEs, transmit a HARQ feedback history configuration to the UE, and/or receive a HARQ feedback history report from the UE based on the configuration, for example, by coordinating with the HARQ module 608.

In an embodiment, the BS 600 can include multiple transceivers 610 implementing different RATs (e.g., NR and LTE). In an embodiment, the BS 600 can include a single transceiver 610 implementing multiple RATs (e.g., NR and LTE). In an embodiment, the transceiver 610 can include various components, where different combinations of components can implement different RATs.

In an embodiment, the BS 600 may operate as a TRP. In an embodiment the BS 600 may perform transmission and/or reception via multiple TRPs (e.g., each including at least a RF unit similar to the RF unit 514 and an antenna similar to the antenna 516). In an example, the multiple TRPs are remote TRPs and the BS 600 is in communication with the multiple TRPs.

Figure 7:
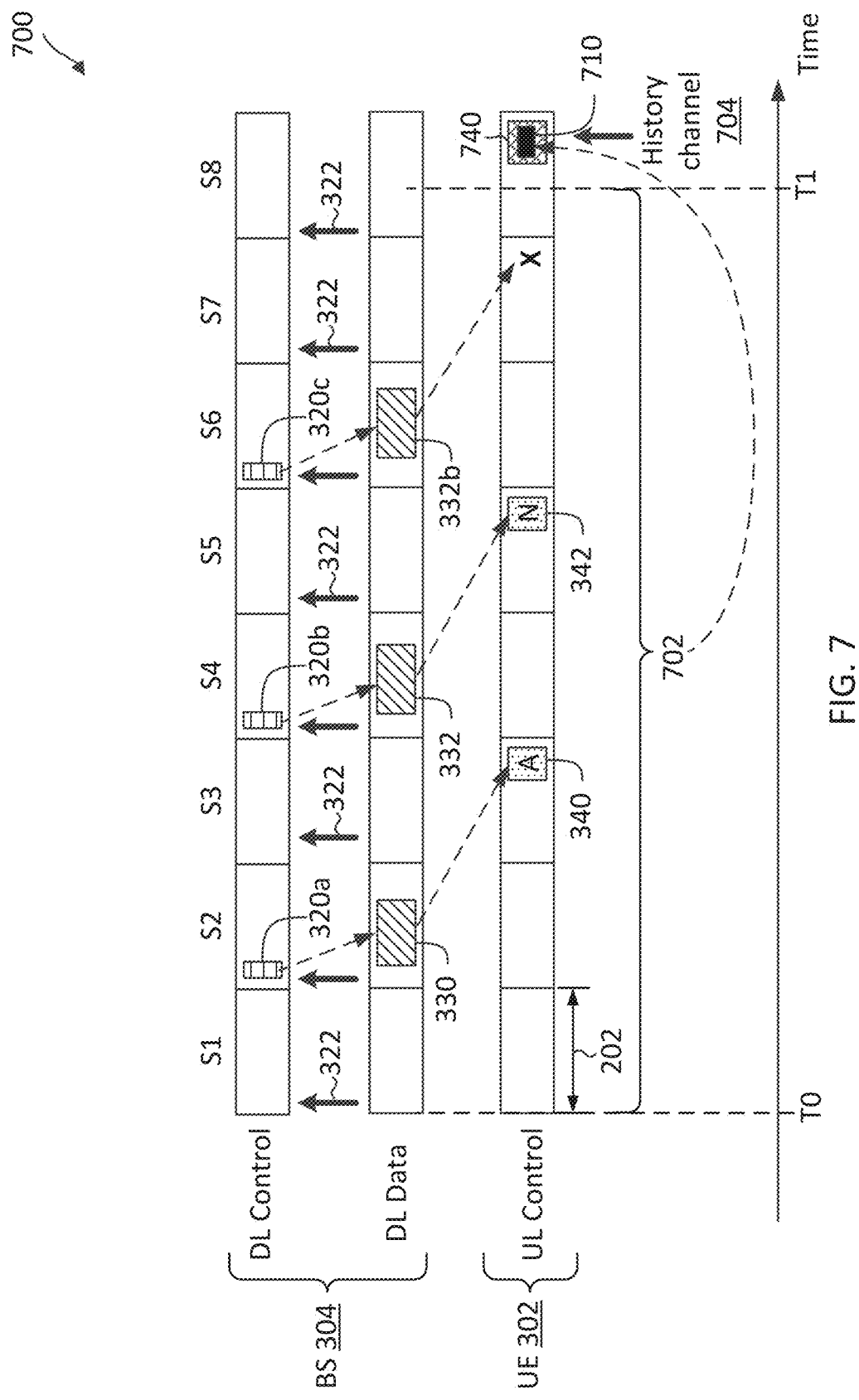
FIG. 7 illustrates a HARQ feedback history reporting scheme according to some embodiments of the present disclosure.

FIG. 7 illustrates a HARQ feedback history reporting scheme 700 according to some embodiments of the present disclosure. The scheme 700 may be employed by a BS such as the BSs 105, 304, 404, and/or 600 and a UE such as the UEs 115, 302, 402, and/or 500 in a network such as the network 100. In particular, the UE may provide the BS with a HARQ feedback history. In FIG. 7, the x-axis represents time in some arbitrary units. The scheme 700 is described using the same DL and UL transmission scenario as in the scenario 300 shown in FIG. 3, and may use the same reference numerals as in FIG. 3 for simplicity sake. Similar to the scenario 300, the UE 302 transmit an individual feedback (e.g., an ACK 340 or a NACK 342) for each received data block (e.g., the data block 330 and 332).

However, the UE 302 additionally provides the BS 304 with a record 710 of HARQ feedback history.

For example, the UE 302 generates a record 710 of HARQ feedback history over a time period 702 (from time T0 to time T1). The UE 302 stores a HARQ feedback in the record 710 for each potential transmission occasion 322, for example, in a memory similar to the memory 504. For example, the UE 302 stores, in the record 710, the ACK 340 for the transmission occasion 322 in the slot S2 202. The UE 302 stores, in the record 710, the NACK 342 for the transmission occasion 322 in the slot S4 202. Additionally, the UE 302 generates a NACK (e.g., the NACK 342) for each transmission occasion 322 that the UE 302 fails to receive a corresponding scheduling grant 320 (e.g., PDCCH) and stores the NACK in the record 710 for the corresponding transmission occasion 322. In other words, the UE 302 may feedback a NACK when no PDCCH is detected or when a NACK is actually transmitted. The UE 302 may store the feedbacks in the record 710 according to a time order of the transmission occasions 322. In other words, the record 710 includes an accumulation of UE 702's decoding results for the transmission occasions 322. The following shows an example of the record 710:

HARQ feedback history record 710=[$N,N,A,N,N,N,N,N$], where N represents a NACK 342 and A represents an ACK 340.

The BS 304 may request the UE 302 to transmit a HARQ feedback history report 740. The UE may transmit a HARQ feedback history report 740 including the record 710, for example, in the slot S8 202. The HARQ feedback history record 710 can assist the BS 304 in detecting UL communication errors, such as the DTX-to-ACK error and the NACK-to-ACK error, described above with respect to FIG. 4. For example, the BS 304 may have mis-detected the DTX (e.g., no feedback transmission) in the slot S7 202 as an ACK or the NACK 342 in the slot S5 202 as an ACK during the earlier UL transmissions. After receiving the HARQ feedback history record 710, the BS 304 may detect the UL error based on a comparison of the earlier UL transmission against the HARQ feedback history record 710. Thus, the BS 304 may retransmit the data block 332 to the UE 302 at a later transmission occasion 322.

In an example, the BS 304 may perform inner-loop tracking based on the individual ACK/NACK feedbacks. The inner-loop tracking may include UL and/or DL power adjustments, DL adaptation of the DL control channel (e.g., PDCCH), DL adaptation of the DL data channel (e.g., PDSCH), and/or any adjustments for UL and/or DL communications. Additionally, the BS 304 may perform outer-loop tracking based on the HARQ feedback history record 710. The outer-loop tracking may include UL and/or DL power adjustments, DL adaptation of the DL control channel (e.g., PDCCH), DL adaptation of the DL data channel (e.g., PDSCH), and/or any adjustments for UL and/or DL communications.

In an example, the BS 304 may configure the UE 302 to provide periodic HARQ feedback history records 710. In an example, the BS 304 may configure the UE 302 to use one codebook for the individual HARQ ACK/NACK transmission (e.g., the ACKs 340 and the NACKs 342) and another codebook for the HARQ feedback history transmission (e.g., the record 710). In an example, the BS 304 may configure the UE 302 with certain UL resources (e.g., time-frequency resources) as a HARQ feedback history channel 704 for HARQ feedback history transmission. In the example shown in FIG. 7, the UL resources for the HARQ feedback history channel 704 is located in the slot S8 202. The BS 304 may use various mechanisms to configure the UE 302 for HARQ feedback history reporting. In an example, the HARQ feedback history configuration may be a semi-static periodic configuration via an RRC configuration. In an example, the HARQ feedback history configuration may be a dynamic configuration via a DL control information (DCI) trigger. Mechanisms for HARQ feedback history configuration are described in greater detail herein below.

To improve communication reliability, a network (e.g., the network 100) or a BS (e.g., the BSs 105, 304, 404, and 600) may repeat the transmission of a data block (e.g., the data blocks 330 and 332) in time, frequency, and/or space. In an example, multiple PDSCH signals carrying the same data block can be transmitted in different slots (e.g., the slots 202) for the same frequency carrier and the same TRP to achieve power accumulation across time. In an example, multiple PDSCH signals carrying the same data block can be transmitted in different component carriers to achieve frequency-diversity. In an example, multiple PDSCH signals carrying the same data block can be transmitted by different TRPs to achieve spatial-diversity.

In a single PDSCH transmission with no repetition, the BS may track the decoding result of each PDSCH transmission and a corresponding PDCCH DCI transmission based on feedbacks from the UE. For PDCCH, the BS may determine the PDDCH decoding result based on whether a corresponding ACK/NACK is received from the UE with the exception that the BS may not be able to distinguish between a DTX and an actual NACK. For PDSCH, the BS may determine PDSCH decoding result based on ACK/NACK feedbacks. The statistics of the decoding results may assist the BS to perform outer-loop control, for example, DL power adjustments, DL adaptation, and/or determine the quality or performance of the inner-loop control.

To further improve communication reliability, a TB may be transmitted with repetitions over multiple component carriers. Alternatively or Additionally, the repetitions can be transmitted from multiple TRPs. In traditional HARQ processing, when a TB is transmitted with repetitions, the UE may feedback the overall decoding result of the transmissions in the multiple component carriers and/or from the multiple TRPs, but may not provide an individual feedback for each copy of the repetition (e.g., each transmission on each component carrier and/or each transmission from each TRP). In other words, the UE may provide a single feedback per TB. A per TB feedback may be sufficient for data decoding (e.g., HARQ inner-loop control), but may not be sufficient for the purpose of outer-loop monitoring and/or tracking on a per component carrier and/or a per TRP basis.

Figure 8:
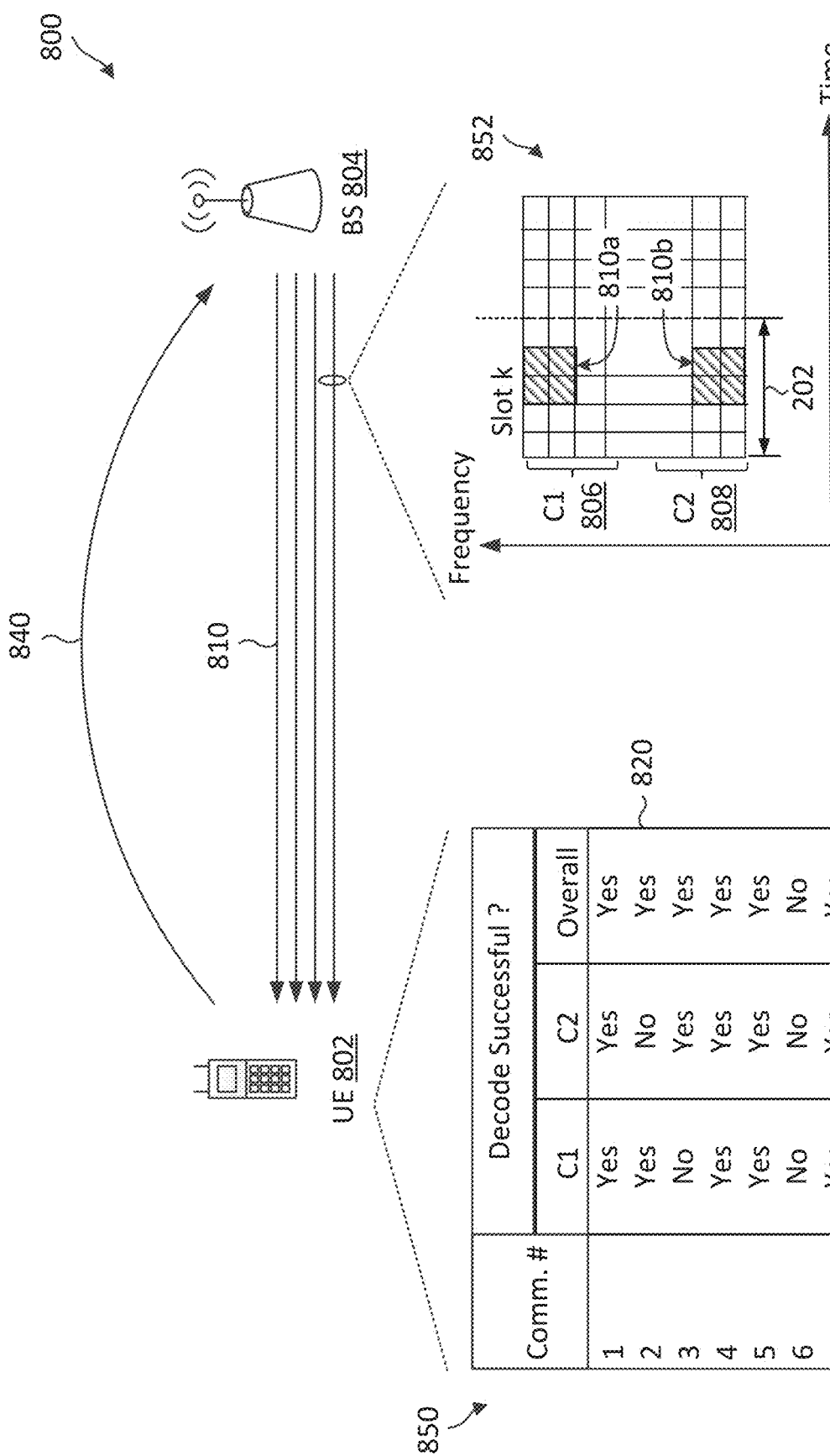
FIG. 8 illustrates a HARQ feedback history reporting scheme according to some embodiments of the present disclosure.
Figure 9A:
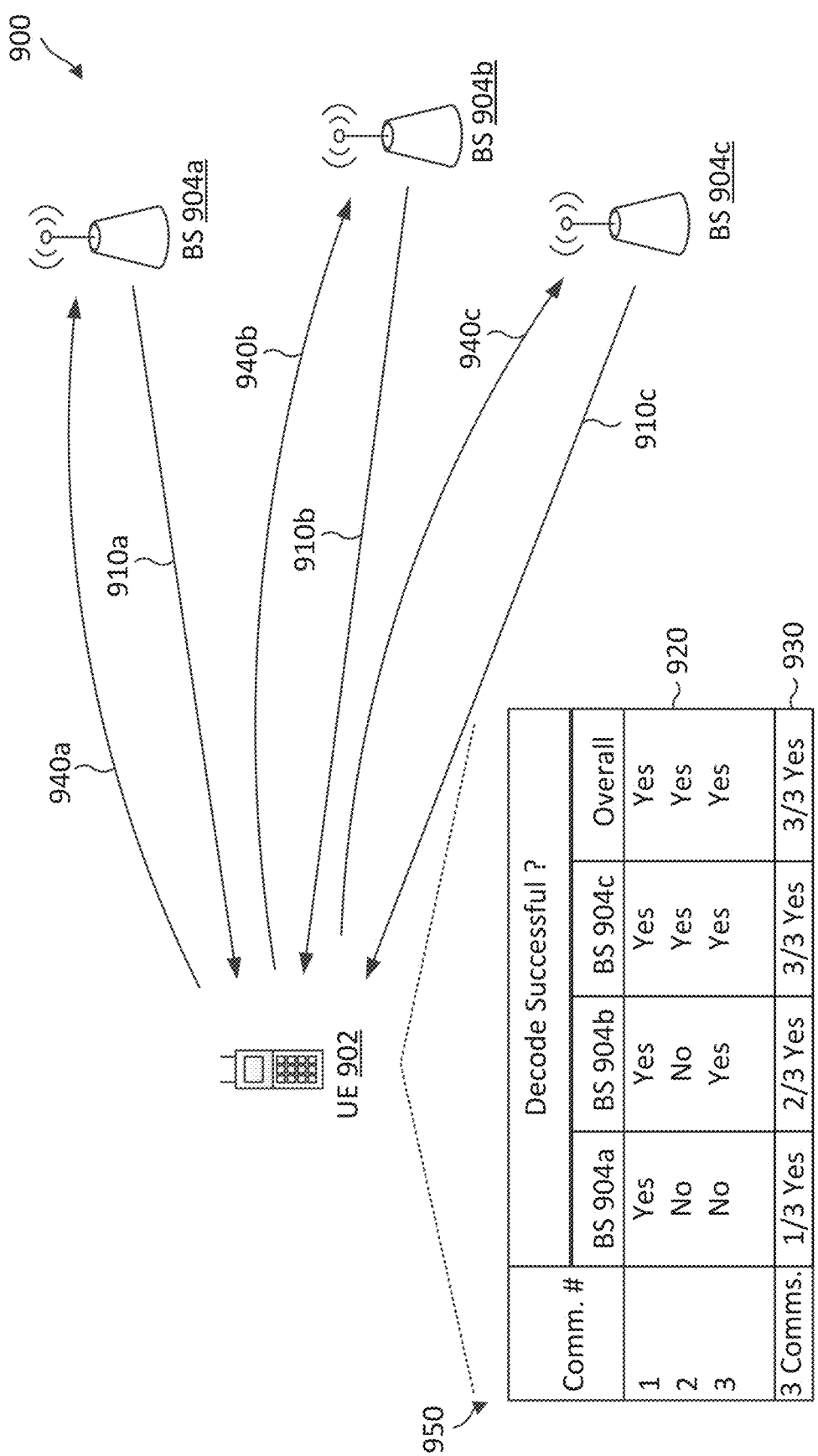
FIG. 9A illustrates a HARQ feedback history reporting scheme according to some embodiments of the present disclosure.
Figure 9B:
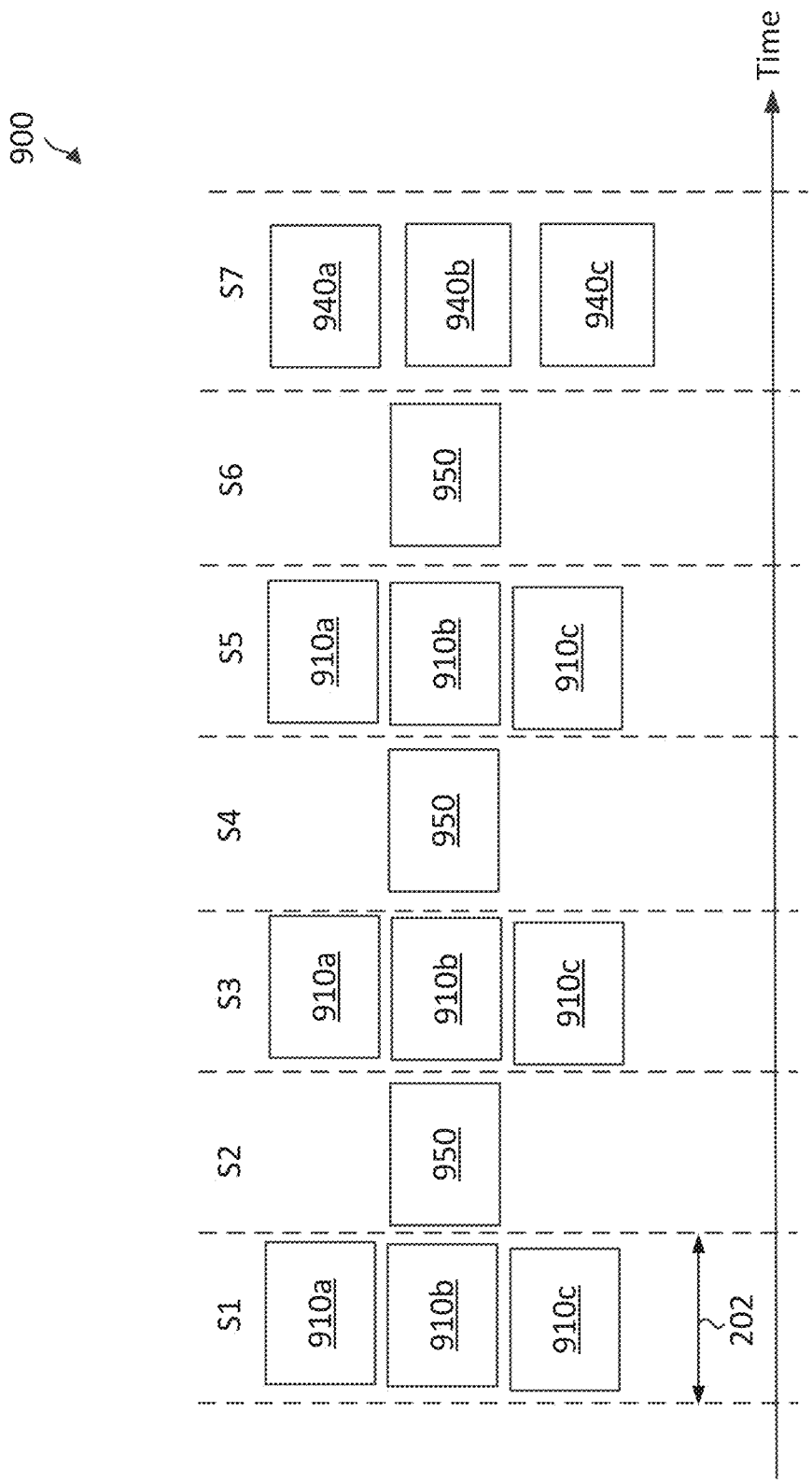
FIG. 9B illustrates a HARQ feedback history reporting scheme according to some embodiments of the present disclosure.

FIGS. 8, 9A, and 9B illustrate various mechanisms for a UE (e.g., the UEs 115, 302, 402, and/or 500) to report HARQ feedback history to improve outer-loop performance. In FIGS. 8, 9A, and 9B, the schemes 800 and 900 may be employed by a BS such as the BSs 105, 304, 404, and/or 600 and a UE such as the UEs 115, 302, 402, and/or 500 in a network such as the network 100. In particular, the BS may schedule the UE with multiple PDSCH transmission in different component carriers and/or from different TRPs. Additionally, FIGS. 8, 9A, and 9B are described using the same transmission frame structure as FIG. 2, and may use the same reference numerals as in FIG. 2 for simplicity sake.

FIG. 8 illustrates a HARQ feedback history reporting scheme 800 according to some embodiments of the present disclosure. In FIG. 8, the x-axis represents time in some arbitrary units and the y-axis represents frequency in some arbitrary units. The scheme 800 may use substantially similar mechanism for HARQ communications as in the schemes 300 and 700, but may use multiple component carriers for communications to obtain frequency-diversity. FIG. 8 illustrates DL communications transmitted over two component carriers, a component carrier C1 C1 806 and a component carrier C2 C2 808 for purposes of simplicity of discussion, though it will be recognized that embodiments of the present disclosure may scale to many more component carriers (e.g., 3, 4, or more).

In the scheme 800, a BS 804 (e.g., the BSs 105, 304, 404, and/or 600) transmits a plurality of DL communications 810 to a UE 802 (e.g., the UEs 115, 302, 402, and/or 500). The BS 804 transmits each DL communication 810 in the component carrier C1 806 and the component carrier C2 808. Each DL communication 810 may correspond to a TB similar to the data blocks 330 and 332. The TB may include DL data associated with a certain HARQ process similar to the HARQ processes 312. The transmissions on the component carriers C1 806 and C2 808 are repetitive transmissions of the TB or DL data. As shown by the reference numeral 852, the transmission on the component carrier C1 806 is referred to as 810a, and the transmission on the component carrier C2 808 is referred to as 810b. Further, the BS 804 can schedule the DL communication 810a and the DL communication 810b to be transmitted at the same time during a slot k 202. Each DL communication 810a, 810b may be transmitted via a PDSCH channel. The BS 804 may transmit a first DL communication 810 (including a DL communication 810a on the component carrier C1 806 and a DL communication 810b on the component carrier C2 808), a second DL communication 810 (including a DL communication 810a on the component carrier C1 806 and a DL communication 810b on the component carrier C2 808), and so on.

In an example, the BS 804 may configure the UE 802 with a plurality of transmission occasions (e.g., the transmission occasions 322) for the component carrier C1 806 and a plurality of transmission occasions for the component carrier C2 808. For each DL communication 810 on each component carrier C1 806 and component carrier C2 808, the BS 804 may provide the UE 802 with a corresponding DL scheduling grant (e.g., the scheduling grants 320). The UE 802 may monitor for a scheduling grant from the BS 804 in the component carrier C1 806 and component carrier C2 808 based on the configured transmission occasions. The UE 802 may receive DL communications from the BS 804 based on detected scheduling grant.

The UE 802 may receive a first DL communication 810 (including a DL communication 810a on the component carrier C1 806 and a DL communication 810b on the component carrier C2 808), a second DL communication 810 (including a DL communication 810a on the component carrier C1 806 and a DL communication 810b on the component carrier C2 808), and so on. The UE 802 may determine a decoding result 820 for each received DL communication 810a and each received DL communication 810b. In an example, the UE 802 may transmit an individual feedback for each received DL communication 810a and each received DL communication 810b based on corresponding decoding results 820. The UE 802 may transmit an ACK (e.g., the ACK 340) for a successful decoding and transmit a NACK (e.g., the NACK 342) for a failed decoding.

In an example, the UE 802 may determine an overall decoding result for each DL communication 810 (e.g., a TB) based on decoding results 820 for corresponding the DL communication 810a and 810b. For example, the UE 802 may determine a success for an overall decoding when the UE 802 can successfully decode any of the repetitions (e.g., the DL communication 810a and 810b).

Additionally, the UE 802 may record an accumulation of all the decoding results 820, for example, in a memory similar to the memory 504. For example, the UE 802 may generate a record of the decoding, including in each entry, a decoding result 820 for a DL communication 810a on the component carrier C1 806, a decoding result 820 for a corresponding DL communication 810b on the component carrier C2 808, and an overall decoding result 820 for the DL communications 810a and 810b.

As shown by the reference numeral 850, for a first DL communication 810, the UE 802 receives a DL communication 810a from C1 with a successful decoding and a DL communication 810b from C2 with a successful decoding. Accordingly, the UE 802 may determine that an overall decoding for the first DL communication 810 is successful. For a second DL communication 810, the UE 802 receives a DL communication 810a from C1 with a successful decoding and a DL communication 810b from C2 with a failed decoding. Since DL communication 810a is received successfully for the second DL communication 810, the UE 802 may determine that an overall decoding for the second communication is successful. The UE 802 may determine the decoding results for each component carrier C1 806 and C2 808 and an overall decoding for each remaining DL communication 810 in a similar manner.

The BS 804 may configure the UE 802 to provide a HARQ feedback history report via a HARQ feedback history channel using similar mechanisms as in the scheme 700. To reduce communication overhead, the UE 802 may not repeat each of the individual feedback or decoding result 820 in the report. Instead, the UE 802 may compute an aggregated decoding result 830 for the DL communications 810 in the record. The UE 802 computes the aggregated decoding result 830 based on the decoding results 820 for the component carrier C1 806 and the component carrier C2 808. The UE 802 transmits a HARQ feedback history report 840 including the aggregated decoding result 830.

The UE 802 may determine an aggregated decoding result 830 based on a success rate for the decoding. The success rate can be computed by counting the number of ACKs for a certain component carrier in the decoding results 820, counting the number of NACKs for the component carrier in the decoding results 820, and determining a ratio between the number of ACKs and a total number of ACKs and NACKs for a certain component carrier as shown below:

$$\text{Success rate} = \text{Number of ACKs}/(\text{Number of ACKs} + \text{Number of NACKs}). \tag{1}$$

In an example, the UE 802 determines a success rate on a per component carrier basis. For example, the UE 802 determines a decoding success rate of about 71% (e.g., 5/7 Yes) for the component carrier C1 806 and a decoding success rate of about 71% (e.g., 5/7 Yes) for the component carrier C2 808. The UE 802 may transmit one HARQ feedback history report 840 including the decoding success rate for the component carrier C1 806 and the decoding success rate for the component carrier C2 808. Alternatively, the UE 802 may transmit the decoding success rate for the component carrier C1 806 and the decoding success rate C2 808 for the component carrier C2 808 in separate reports 840. In an example, the UE 802 determines a success rate for all component carriers based on the overall decoding results 820. For example, the UE 802 determines an overall success rate of about 86% (e.g., 6/7 Yes) for the component carrier C1 806 and the component carrier C2 808.

In some examples, the BS 804 may configure the UE 802 with a HARQ feedback history report period (e.g., the period 702) and the number of DL communications 810 to include in a HARQ feedback history report 840 may be based on the configured report period. The reporting can be at a low-duty cycle (e.g., at about every 5 ms, 10 ms, 15 ms, or 20 ms or more). Additionally, the BS 804 may configure the UE 802 to provide an overall HARQ feedback history report for all component carriers. Alternatively, the BS 804 may configure the UE 802 to provide a HARQ feedback history report on a per component carrier basis. Mechanisms for HARQ feedback history report configuration are described in greater detail herein below.

In some examples, the UE 802 may feedback a decoding statistic, for example, a filtered or averaged decoding result for the HARQ feedback history report period. In some examples, the UE 802 may feedback the fraction of corrected decoded DL communications within a report period. In some examples, the UE 802 may feedback the number of corrected decoded DL communications within a report period.

In some examples, the HARQ feedback history report 840 may include various forms of information associated with the accumulated decoding results 820 (e.g., including an individual ACK/NACK feedback for each communication 810a, 810b and/or the aggregated decoding results 830, such as decoding statistics of the respective decoding results, decoding statistics of the accumulated decoding results 820 and/or aggregated decoding results 830, and/or the like. For example, the report 840 may include information identifying a percentage of the plurality of communications, transmitted on the physical DL channel, that were successfully decoded by UE 802. The report 840 may include information identifying a ratio of the quantity of the plurality of communications 810, transmitted on the physical DL channel, that were successfully decoded by UE 802 to the quantity of the plurality of communications 810 received on the physical DL channel. The report 840 may include information identifying a fraction of the plurality of communications 810, transmitted on the physical DL channel, that were successfully decoded by UE 802. The report 840 may include information identifying a quantity of the plurality of communications 810, transmitted on the physical DL channel, that were successfully decoded by UE 802. The report 840 may include information identifying the particular communications, of the plurality of communications 810, transmitted on the physical DL channel, that were successfully decoded by UE 802. The report 840 may include information identifying the particular communications, of the plurality of communications 810, transmitted on the physical DL channel, that were not successfully decoded by UE 802, and/or the like.

In some examples, the report 840 may include one or more bits, flags, values, information fields, and/or the like, representing the decoding statistics of the respective decoding results, representing the decoding statistics of the accumulated decoding results 820 and/or aggregated decoding results 830, and/or the like. For example, the report 840 may include may include a bit that represents a binary indicator of whether the percentage of the plurality of communications 810, transmitted on the physical DL channel, that were successfully decoded by UE 802 satisfies or does not satisfy a threshold percentage (e.g., a bit value 1 may indicate that the percentage is greater than or equal to 90%, a bit value of 0 may indicate that the percentage is less than 90%, and/or the like). As another example, the report 840 may include two or more bits that represent a percentage range, of a plurality of percentage ranges, in which a percentage of the plurality of communications 810, transmitted on the physical DL channel, that were successfully decoded is included. For example, the report 840 may include two bits that may represent a first percentage range, a second percentage range, a third percentage range, and a fourth percentage range. In some examples, the plurality of percentage ranges may be uniform and/or equal (e.g., a first percentage range $r_1$ may be $0\% \leq r_1 > 25\%$, the second percentage range $r_2$ may be $25\% \leq r_2 > 50\%$, the third percentage range $r_3$ may be $50\% \leq r_3 > 75\%$, and the fourth percentage range $r_4$ may be $75\% \leq r_4 > 100\%$), the plurality of ranges may be non-uniform (e.g., where one or more percentage ranges, of the plurality of percentage ranges, are larger or smaller than one or more other percentage ranges of the plurality of percentage ranges, and/or the like). In some examples, the threshold percentage may be determined based at least in part on a configuration by the BS 804 via an RRC configuration, a MAC control element (CE) configuration, or a DCI message.

In some examples, the report 840 may further include information identifying an overall decoding result for each communication (e.g., the DL communication 810a and 810b), of the plurality of communications 810, that were transmitted on a plurality of physical DL channels in which the physical DL channel is included.

In some examples, the BS 804 may request a quantized feedback for the report 840. For example, the BS 804 may request the UE 802 to partition the individual HARQ ACKs/NACKs within a reporting period in the groups, bundle the individual HARQ ACKs/NACKs within one group, and feedback the bundled result (e.g., a single bit indication) for each group.

In some examples, BS 804 may receive the report 840 and may use the information associated with the accumulated decoding results 820 and/or the aggregated decoding results 830 to improve outer-loop control and/or tracking, which may include performing power adjustments for the plurality of physical DL channels, inner-loop control adjustments for the plurality of physical DL channels, downlink link adaptation for the plurality of physical DL channels, and/or the like.

FIGS. 9A and 9B collectively illustrate a HARQ feedback history reporting scheme 900 according to some embodiments of the present disclosure. In FIG. 9B, the x-axis represents time in some arbitrary units. The scheme 900 may use substantially similar mechanisms for HARQ communications as in the schemes 700 and 800, but may use multiple BSs to repeat the transmission of a DL communication. FIGS. 9A and 9B illustrate DL communications 910a, 910b, and 910c transmitted by three BSs 904a, 904b, and 904c, respectively, for purposes of simplicity of discussion, though it will be recognized that embodiments of the present disclosure may scale to any suitable number of BSs 904 (e.g., 2, 4, 5 or more). The BSs 904 may be substantially similar to the BSs 105, 304, 404, 600, and/or 804. While the BSs 904a, 904b, and 904c are shown as individual BSs, in some embodiments, the BSs 904a, 904b, and 904c may be TRPs associated with a BS (e.g., the BSs 105, 304, 404, 600, and 804). In some examples, the TRPs can be co-located with the BS. In some examples, the TRPs can be located remotely from the BS.

In the scheme 900, for each DL communication 910, the BS 904a may transmit a first repetitive transmission 910a (e.g., via a first PDSCH) to a UE 902 (e.g., the UEs 115, 302, 402, 500, and/or 802), the BS 904b may transmit a second repetitive transmission 910b (e.g., via a second PDSCH) to the UE 902, the BS 904c may transmit a third repetitive transmission 910c (e.g., via a third PDSCH) to the UE 902. The BSs 904a, 904b, and 904c may perform similar transmission for a second communication 910, a third communication 910, and so on. Each DL communication 810 may correspond to a TB similar to the data blocks 330 and 332. The TB may include DL data associated with a certain HARQ process similar to the HARQ processes 312. The transmissions from the BSs 904a, 904b, and 904c are repetitive transmissions of the TB or DL data.

As shown in FIG. 9B, the BS 904a, BS 904b, and BS 904c may transmit a plurality of DL communications 910 across a plurality of slots 202. For a first DL communication 910, the BS 904a, BS 904b, and BS 904c may transmit the repetitive transmissions 910a, 910b, and 910c, respectively, in a slot S1 202. For a second DL communication 910, the BS 904a, BS 904b, and BS 904c may transmit the repetitive transmissions 910a, 910b, and 910c, respectively, in a slot S3 202. For a third DL communication 910, the BS 904a, BS 904b, and BS 904c may transmit the repetitive transmissions 910a, 910b, and 910c, respectively, in a slot S5 202. For each DL communication 910a, 910b, and 910c, the UE 902 may be configured with a corresponding DL scheduling grant (e.g., the scheduling grants 320). In some examples, the BSs 904a, 904b, and 904c may coordinate with each other for the transmissions of a particular TB.

In an example, the BS 904a, 904b, and/or 904c may configure the UE 802 with a plurality of transmission occasions (e.g., the transmission occasions 322). For each DL communication 910a, 910b, 910c, the BS 804 may provide the UE 802 with a corresponding DL scheduling grant (e.g., the scheduling grants 320). The UE 902 may monitor for a scheduling grant from the BSs 904a, 904b, and/or 904c based on the configured transmission occasions. The UE 902 may receive DL communications from the BS 804 based on detected scheduling grant.

The UE 902 may receive a first DL communication 910 (including a DL communication 910a from the BS 904a, a DL communication 910b from the BS 904b, and a DL communication 910c from the BS 904c), a second DL communication 810 (including a DL communication 910a from the BS 904a, a DL communication 910b from the BS 904b, and a DL communication 910c from the BS 904c), and so on. The UE 902 may determine a decoding result 920 for each received DL communication 910a, 910b, and 910c. In an example, the UE 902 may transmit an individual feedback for each received DL communication 910a, 910b, 910c based on a corresponding decoding result 920. For example, the UE 902 transmit an ACK (e.g., the ACK 340) for a successful decoding and a NACK (e.g., the NACK 342) for a failed decoding.

In an example, the UE 902 may determine an overall decoding result for each DL communication 910 (e.g., a TB) based on decoding results 920 for corresponding the DL communications 910a, 910b, and 910c. The UE 902 may determine a success for an overall decoding when the UE 902 can successfully decode any of the repetitive transmissions (e.g., the DL communication 910a, 910b, and 910c). For example, after receiving each DL communication 910 (e.g., including the repetitive transmission 910a, 910b, and 910c), the UE 902 may transmit a feedback 950 including a corresponding overall decoding result 920. As shown in FIG. 9B, the UE 902 transmits a feedback 950 for the first DL communication 910 in the slot S2 202, transmits a feedback 950 for the second DL communication 910 in the slot S4 202, and transmits a feedback 950 for the third DL communication 910 in the slot S6 202. The UE 902 may transmit a report 950 for a corresponding DL communication 910 to one or more of the BSs 904a, 904b, and 904c.

Additionally, the UE 902 may record all the decoding results 920, for example, in a memory similar to the memory 504. For example, the UE 902 may generate a record of the decoding history including in each entry, a decoding result 920 for a DL communication 910a received from the BS 904a, a decoding result 920 for a DL communication 910b received from the BS 904b, a decoding result 920 for a DL communication 910c received from the BS 904c, and an overall decoding result 920 for the DL communications 910a, 910b, and 910c. The UE 902 may generate similar entries in the record in a similar manner as in the scheme 800, but with decoding results for different BSs 904 instead of for different component carriers as in the scheme 800.

As shown by the reference numeral 952, for a first DL communication 910, the UE 902 receives a DL communication 910a from the BS 904a with a successful decoding, a DL communication 910b from the BS 904b with a successful decoding, and a DL communication 910c from the BS 904c with a successful decoding, and thus the UE 902 may determine that an overall decoding for the first communication is successful. For a second communication, the UE 902 receives a DL communication 910a from the BS 904a with a failed decoding, a DL communication 910b from the BS 904b with a failed decoding, and a DL communication 910c from the BS 904c with a successful decoding, and thus the UE 902 may determine that an overall decoding for the second communication is successful. For a third communication, the UE 902 receives a DL communication 910a from the BS 904a with a failed decoding, a DL communication 910b from the BS 904b with a successful decoding, and a DL communication 910c from the BS 904c with a successful decoding, and thus the UE 902 may determine that an overall decoding for the third communication is successful. Thus, the UE 902 may indicate a decoding success for each of the report 950 shown in FIG. 9B.

The BS 904a, 904b, and/or 904c may configure the UE 902 to provide a HARQ feedback history report 940 via a HARQ feedback history channel in a similar manner as in the schemes 700 and 800. The UE 902 may include an accumulation of the decoding results 920 and/or an aggregated decoding result 930 in the report 940. The UE 902 may use similar mechanisms as described in the scheme 800 to determine the aggregated result 930. In the example, the UE 902 determines a decoding success metric (e.g., represented as a ratio of number of successful decoding to total number of decoding) for the aggregated decoding results 930 on a per TRP or BS basis. For example, the UE 902 may determine a decoding success metric of 1/3 for the BS 904a, a decoding success metric of 2/3 for the BS 904b, and a decoding success metric of 3/3 for the BS 904c based on corresponding individual decoding results 920. The UE 902 may further determine an aggregated decoding result 930 of 3/3 for the overall decoding results 920.

The UE 902 transmits a HARQ feedback history report 940a to the BS 904a, transmit a HARQ feedback history report 940b to the BS 904b, and transmit a HARQ feedback history report 940c to the BS 904c. The UE 902 may transmit the reports 940a, 940b, and 940c in the slot S7 202 as shown in FIG. 9B. Alternatively, the UE 902 may transmit the reports 940a, 940b, and 940c in different slots 202. In an example, the report 940a may include the aggregated decoding result 930 (e.g., 1/3) for the BS 904a, the report 940b may include the aggregated decoding result 930 (e.g., 2/3) for the BS 904*b*, and the report 940*c* may include the aggregated decoding result 930 (e.g., 3/3) for the BS 904*c*.

In some examples, the UE 902 may configure a HARQ feedback history report (e.g., the report 940*a*, 940*b*, or 940*c*) to be transmitted to the BSs 904*a*, 904*b*, and 904*c* based at least in part on a transmission configuration indicator (TCI) state associated with the BSs 904*a*, 904*b*, and 904*c*, based at least in part on a TCI state group associated with the BSs 904*a*, 904*b*, and 904*c*, and/or the like. For example, UE 902 may transmit the HARQ feedback history on a per TCI state basis, on a per TCI state group basis, and/or the like. As another example, UE 902 may include the HARQ feedback history report, for a particular TCI state and BS (e.g., the BS 904*a*, 904*b*, or 904*c*) combination in a CSI report associated with the particular TCI state and BS combination. As a further example, UE 902 may transmit the HARQ feedback history report in a CSI report associated with a particular TCI group. In some examples, UE 902 may periodically transmit the HARQ feedback history report to the plurality of BSs 904*a*, 904*b*, and 904*c* at a particular time interval (e.g., the time period 702). For example, UE 902 may transmit the HARQ feedback history report to the BSs 904*a*, 904*b*, and 904*c* at the same time interval. As another example, UE 902 may transmit the HARQ feedback history report to some BSs of the BSs 904*a*, 904*b*, and 904*c* at different time intervals. As a further example, UE 902 may transmit the HARQ feedback history report to each BS of the BSs 904*a*, 904*b*, and 904*c* at different time intervals.

In some examples, UE 902 may transmit the HARQ feedback history report 940 to the plurality of BSs 904*a*, 904*b*, and 904*c* in a manner similar to that described above in FIG. 8.

In some examples, the information associated with the accumulated decoding results 920 and/or aggregated decoding results 930, included in the HARQ feedback history report 940 may include information similar to that described above in FIG. 8.

In some examples, the plurality of BSs 904*a*, 904*b*, and 904*c* may receive the HARQ feedback history report 940 and may use the information associated with the accumulated decoding results 920 and/or aggregated decoding results 930 to jointly and/or individually improve outer-loop control and/or tracking, which may include performing power adjustments for the plurality of physical DL channels, inner-loop control adjustments for the plurality of physical DL channels, downlink link adaptation for the plurality of physical DL channels, and/or the like.

In some examples, a network (e.g., the network 100) may configure PDSCH repetitions over multiple component carriers (e.g., the component carriers C1 806 and C2 808*a*) and/or multiple TRPs (e.g., the BSs 904*a*, 904*b*, 904*c*), a UE (e.g., the UEs 115, 302, 402, 500, 802, and/or 902) may feedback one bit for each PDSCH the UE received. In a first option, the UE may feedback per TB ACK/NACK and per PDSCH ACK/NACK. In a second option, the UE may feedback per PDSCH ACK/NACK without per TB ACK/NACK. Referring to the example in FIG. 8, the per PDSCH ACK/NACK may refer to the decoding result 820 for each DL communication 810*a* on the component carrier C1 806 and each DL communication 810*b* on the component carrier C2 808, and the per TB ACK/NACK may refer to the overall decoding result 820 each DL communication 810. Referring to the example in FIG. 9, the per PDSCH ACK/NACK may refer to the decoding result 920 for each DL communication (e.g., the DL communication 910*a*, 910*b*, 910*c*) from each BS (e.g., the BSs 904*a*, 904*b*, or 904*c*) for each DL communication 910 and the per TB ACK/NACK may refer to the overall decoding result 920 each DL communication 910. The selection of the first option or the second option may depend on whether the UE performs log-likelihood ratio (LLR) soft-combining across repetitions or based on the RRC configuration and/or the UE capability. Further, the first option may restrict all ACK/NACK bits (for the per TB ACK/NACK and per PDSCH ACK/NACK) to be transmitted on a single PUCCH transmission. Alternatively, the network may configure the per TB ACK/NACK to be multiplexed with one of the PDSCH ACK/NACKs.

In some embodiments, a network (e.g., the network 100) may employ the schemes 800 and 900 in combination to repeat the transmission of a HARQ TB over multiple component carriers with different TRPs transmitting over the different component carriers. In such embodiments, the network may configure a UE (e.g., the UEs 115, 302, 402, 500, 802, and/or 902) to provide HARQ feedback history report (e.g., the reports 840 and 940) using similar mechanism as in the schemes 800 and 900. For example, the network may configure the UE to report an accumulation of all decoding results 920 (e.g., including an ACK/NACK feedback for each communication 910*a*, 910*b*, 910*c*) and/or aggregated decoding results 930 for each component carrier and/or each TRP. Alternatively, the network may configure the UE to report an accumulation of the decoding results 920 and/or aggregated decoding result 930 for all component carriers and/or all TRPs.

Figure 10:
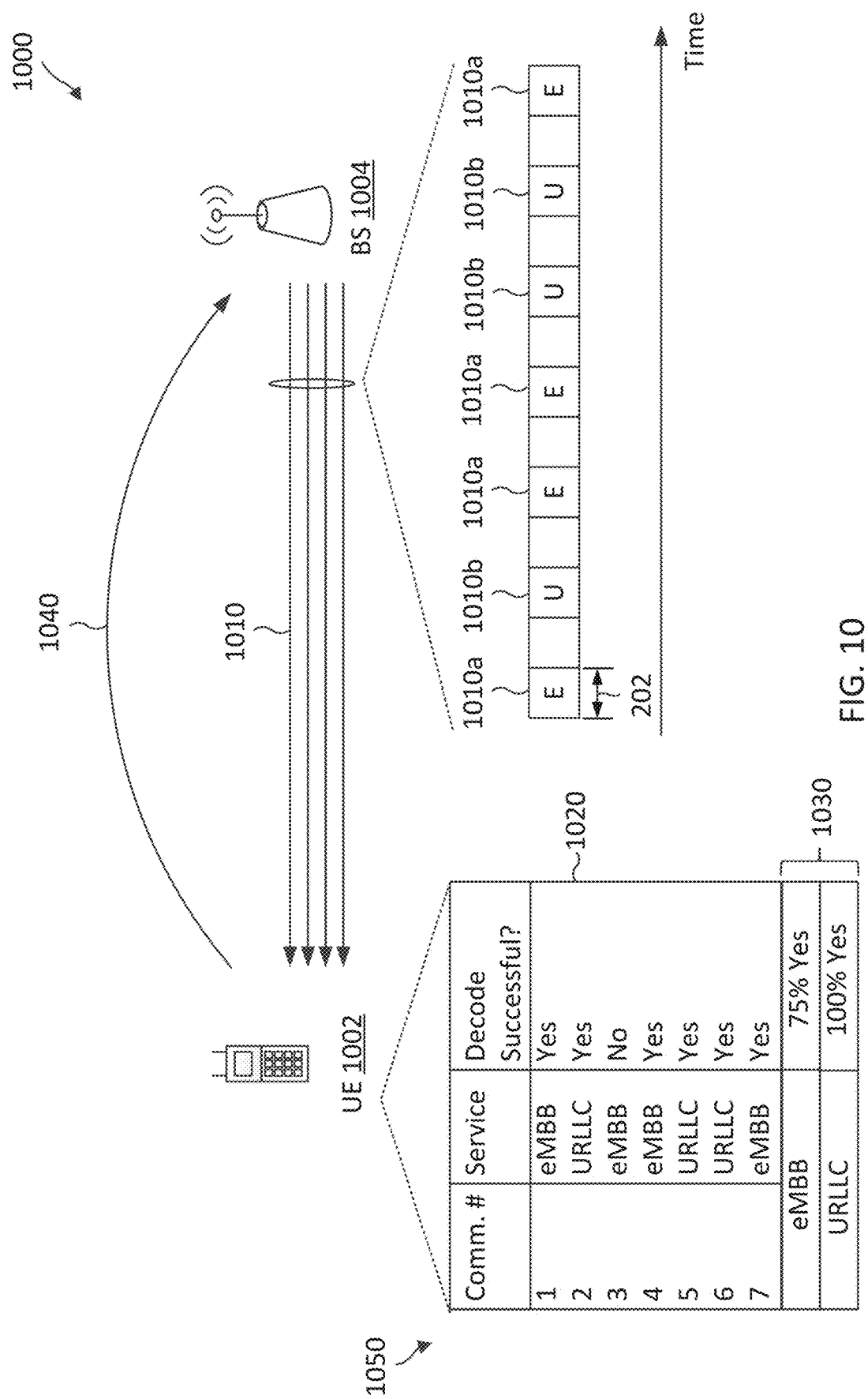
FIG. 10 illustrates a HARQ feedback history reporting scheme according to some embodiments of the present disclosure.

FIG. 10 illustrates a HARQ feedback history reporting scheme 1000 according to some embodiments of the present disclosure. The scheme 1000 may be employed by a BS such as the BSs 105, 304, 404, 600, 804, and 904 and a UE such as the UEs 115, 302, 402, 500, 802, and/or 902 in a network such as the network 100. In particular, the UE may provide the BS with a HARQ feedback history on a per service basis. In FIG. 10, the x-axis represents time in some arbitrary units. The scheme 1000 may use a substantially similar transmission frame structure as shown in FIG. 2, and may use the same reference numerals as in FIG. 2 for simplicity sake. The scheme 1000 may use substantially similar mechanism for HARQ communications as in the schemes 700, 800, and/or 900.

In the scheme 1000, a BS 1004 (e.g., the BSs 105, 304, 404, 600, 804, and/or 904) transmit a plurality of DL communications 1010 to a UE 1002 (e.g., the UEs 115, 302, 402, 500, 802, and/or 902). The DL communications 1010 can include multiple traffic types associated with different services. For example, the DL communications 1010 can include one traffic type associated with an eMBB service (e.g., with a high throughput requirement) and another traffic type associated with a URLLC service (e.g., with a low latency requirement). The DL communication 1010 for the eMBB service may be referred to as 1010*a* (marked as E). The DL communication 1010 for the URLLC service may be referred to as 1010*b* (marked as U).

The UE 1002 may receive the DL communications 1010 from the BS 1004. The UE 1002 may determine a decoding result 1020 for each received DL communication 1010*a* and each received DL communication 1010*b*. In an example, the UE 1002 may transmit an individual feedback for each received DL communication 1010*a* and each received DL communication 1010*b* based on a corresponding decoding result 1020. The UE 1002 may transmit an ACK (e.g., the ACK 340) for a successful decoding and transmit a NACK (e.g., the NACK 342) for a failed decoding.

The UE 1002 may record all the decoding results 1020, for example, in a memory similar to the memory 504. For example, the UE 1002 may generate a record of the decoding, including in each entry, a decoding result 1020 for a DL communication 1010 and a corresponding service or traffic type. As shown by the reference numeral 1050, the UE 1002 receives a first DL communication for the eMBB service with a decoding success, receives a second DL communication for the URLLC service with a decoding success, receives a third DL communication for the eMBB service with a failed decoding, and so on.

The BS 1004 may configure the UE 1002 to provide a HARQ feedback history report via a HARQ feedback history channel using similar mechanisms as in the schemes 700, 800, and 900. The UE may compute an aggregated decoding result 1030 for the eMBB communications and an aggregated decoding result 1030 for the URLLC communications in the record. The aggregated decoding result 1030 can be based on a decoding success rate as shown in Equation (1) above. As shown, the aggregated decoding result 1030 for the eMBB communications is about 75% and the aggregated decoding result 1030 for the URLLC communications is about 100%. The BS 1004 may configure the UE 1002 to provide the HARQ feedback history report on a per service basis.

In an example, the UE 1002 transmits a HARQ feedback history report 1040 indicating the aggregated decoding result 1030 for the eMBB communications 1010*a* and another HARQ feedback history report 1040 indicating the aggregated decoding result 1030 for the URLLC communications 1010*b*. In example, the UE 1002 transmits a single HARQ feedback history report 1040 indicating the aggregated decoding result 1030 for the eMBB communications 1010*a* and the aggregated decoding result 1030 for the URLLC communications 1010*b*. In an example, the UE 1002 transmits a HARQ feedback history report 1040 indicating an accumulation of the decoding results 1020 for the eMBB communications 1010*a* (e.g., including an ACK/NACK for each eMBB communication 1010*a*) and another HARQ feedback history report 1040 indicating an accumulation of the decoding results 1020 for the URLLC communications 1010*b* (e.g., an ACK/NACK for each URLLC communication 1010*b*). In another example, the UE 1002 transmits a single HARQ feedback history report 1040 indicating the accumulated decoding results 1020 for the eMBB communications 1010*a* and the accumulated decoding results 1020 for the URLLC communications 1010*b*.

In some examples, the information associated with the accumulated decoding results 1020 and/or the aggregated decoding results 1030, included in the HARQ feedback history report 1040 may include information similar to that described above in FIG. 8.

In some examples, the plurality of BS 1004 may receive the HARQ feedback history report 1040 and may use the information associated with the accumulated decoding results 1020 and/or the aggregated decoding results 1030 to jointly and/or individually improve outer-loop control and/or tracking, which may include performing power adjustments for the plurality of physical DL channels, inner-loop control adjustments for the plurality of physical DL channels, downlink link adaptation for the plurality of physical DL channels, and/or the like.

In some instances, a HARQ feedback for the URLLC service can collide with a HARQ feedback for the eMBB service. For example, the UE 1002 may be required to transmit an individual feedback (e.g., an ACK 340 or a NACK 342) at the same time. The URLLC service has a more stringent latency requirement than the eMBB service. Accordingly, the UE 1002 may prioritize the transmission of the feedback for the URLLC service over the feedback for the eMBB service. In other words, the UE 1002 may drop the feedback for the eMBB service and transmit the feedback for the URLLC service. The dropping of the feedback for the eMBB service can cause unnecessary retransmission. For example, the UE 1002 decoded the eMBB communication successfully and the feedback is an ACK. Due to the dropped eMBB feedback transmission, the BS 1004 may determine that the eMBB communication failed and retransmit the eMBB communication. With the HARQ history feedback report from the UE 1002 (providing all feedback records in the decoding results 820 for the eMBB communications), the BS 1004 may detect and recover the dropped eMBB feedback(s). Referring to the reference numeral 1050, the UE 1002 can include an ACK for the first communication, a NACK for the third communication, an ACK for the fourth communication, and an ACK for the seventh communication in the report 1040. If the BS misdetect the NACK from the third communication, the BS 1004 can detect the misdetection based on the report 1040 and update and/or correct the HARQ processing for the third communication. Accordingly, the present disclosure can improve eMBB efficiency.

Figure 11:
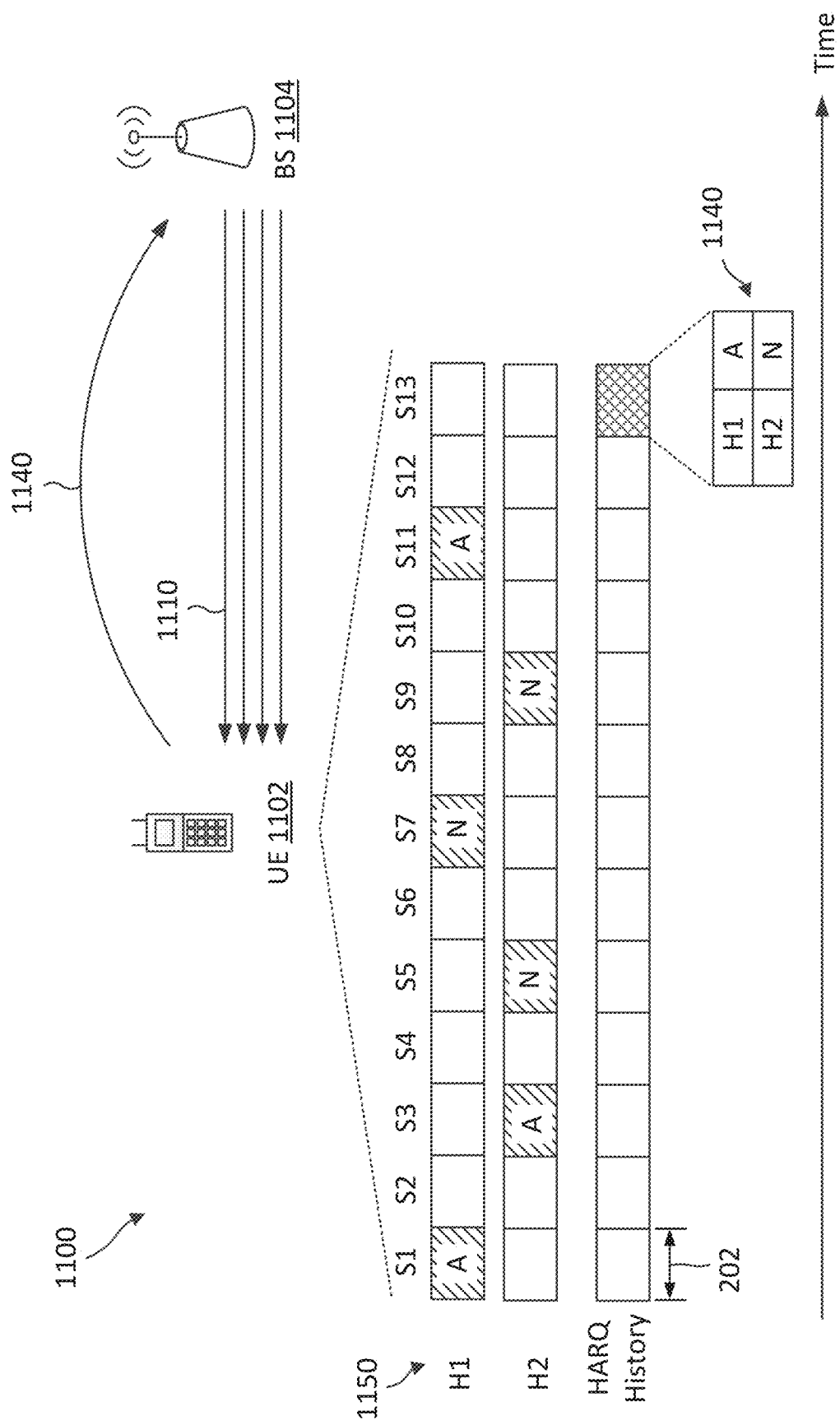
FIG. 11 illustrates a HARQ feedback history reporting scheme according to some embodiments of the present disclosure.

FIG. 11 illustrates a HARQ feedback history reporting scheme 1100 according to some embodiments of the present disclosure. The scheme 1100 may be employed by a BS such as the BSs 105, 304, 404, 600, 804, 904, and/or 1004 and a UE such as the UEs 115, 302, 402, 500, 802, 902, and/or 1002 in a network such as the network 100. In particular, the UE may provide the BS with a HARQ feedback history on a per HARQ process basis. In FIG. 11, the x-axis represents time in some arbitrary units. The scheme 1100 may use a substantially similar transmission frame structure as shown in FIG. 2, and may use the same reference numerals as in FIG. 2 for simplicity sake. The scheme 1100 may use substantially similar mechanism for HARQ communications as in the schemes 700, 800, 900, and/or 1000.

In the scheme 1100, a BS 1104 (e.g., the BSs 105, 304, 404, 600, 804, 904, and/or 1004) transmits a plurality of DL communications 1110 to a UE 1102 (e.g., the UEs 115, 302, 402, 500, 802, 902, and/or 1002). The DL communications 1110 can be associated with multiple HARQ processes (e.g., the HARQ processes). For example, a first DL communication 1110 may include a TB or DL data (e.g., the data blocks 330 and 332) associated with one HARQ process (e.g., H1 of FIG. 3) and a second DL communication 1110 may include a TB or DL data associated with another HARQ process (e.g., H2 of FIG. 3).

The UE 1102 may receive the DL communications 1110 from the BS 1102. The UE 1102 may determine a decoding result for each received DL communication 1110. In an example, the UE 1102 may transmit an individual feedback for each received DL communication 1110 based on a corresponding decoding result. The UE 1102 may transmit an ACK (e.g., the ACK 340) for a successful decoding and transmit a NACK (e.g., the NACK 342) for a failed decoding.

The reference numeral 1150 illustrates the feedbacks transmitted by the UE 1102. An ACK (e.g., the ACK 340) is marked as A and a NACK (e.g., the NACK 342) is marked as N. As shown, for the HARQ process H1, the UE 1102 transmits a NACK in slot S1 202, transmits an ACK in slot S7 202, and transmits an ACK in slot S11 202. For the HARQ process H1, the UE 1102 transmits a NACK in slot S3 202, transmits an ACK in slot S5 202, and transmits a NACK in slot S9 202.

The BS 1104 may request for a HARQ feedback history report 1140 from the UE 1102 at slot S13 202. The UE 1102 may transmit the most recent or latest feedback for each HARQ process to the BS 1102. As shown, the UE 1102 may transmit an ACK for the HARQ process H1 (based on the ACK in the slot S11 202) and a NACK for the HARQ process H2 (based on the NACK in the slot S9 202). In an example, the UE 1102 may maintain or track the most recent individual HARQ-ACK feedback for each HARQ process. The reporting of the most recent HARQ-ACK feedback for a HARQ process can be useful since if two HARQ ACK/NACKs (for two TBs) belong to the same HARQ process, the UE 1102 may have flushed the HARQ buffer for earlier TB and may not benefit from chase combining or incremental redundancy (IR) combining.

In an example, the BS 1104 may configure the UE 1102 to include the most recent HARQ feedback for all HARQ processes in the HARQ feedback history report 1140. In an example, the BS 1104 may configure the UE 1102 to include the most recent HARQ feedback for a subset of HARQ processes in the HARQ feedback history report 1140. In an example, the UE 1102 is served by multiple cells (e.g., the BSs 1104). In such an example, the UE 1102 may be configured to include the most recent HARQ feedback for all HARQ processes on one or multiple serving cells in the HARQ feedback history report 1140

Figure 12:
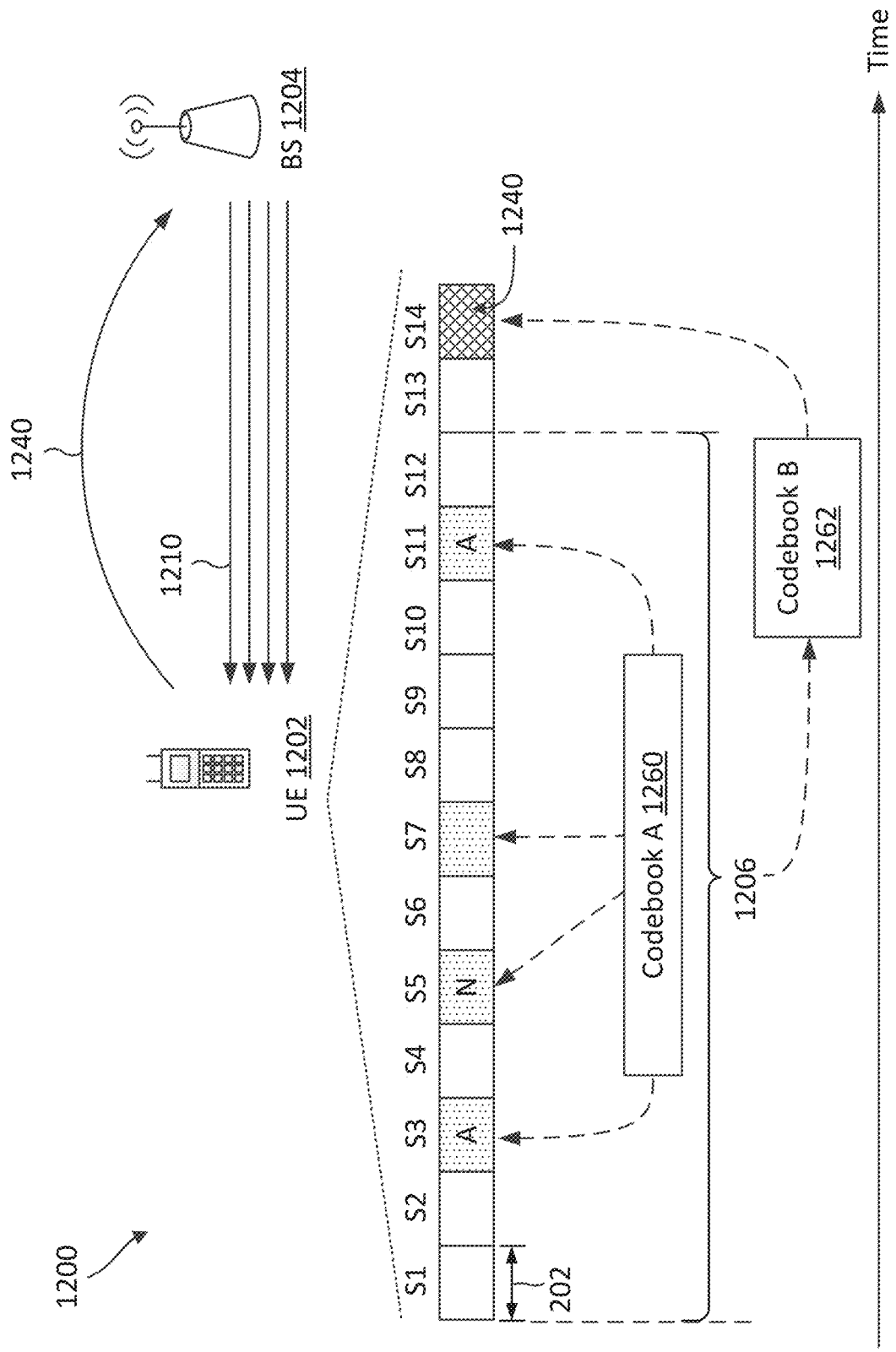
FIG. 12 illustrates a codebook configuration scheme for HARQ feedbacks according to some embodiments of the present disclosure.

FIG. 12 illustrates a codebook configuration scheme 1200 for HARQ feedbacks according to some embodiments of the present disclosure. The scheme 1200 may be employed by a BS such as the BSs 105, 304, 404, 600, 804, 904, 1004, and/or 1104 and a UE such as the UEs 115, 302, 402, 500, 802, 902, 1002, and/or 1102 in a network such as the network 100. The scheme 1200 can be employed in conjunction with the schemes 700, 800, 900, 1000, and 1100 described above. In particular, the BS may configure the UE with multiple codebooks for HARQ feedback transmissions. FIG. 12 illustrates two codebooks, a codebook A 1260 and a codebook B for purposes of simplicity of discussion, though it will be recognized that embodiments of the present disclosure may scale to many more codebooks (e.g., 3, 4, or more). In FIG. 12, the x-axis represents time in some arbitrary units.

In the scheme 1200, a BS 1204 (e.g., the BSs 105, 304, 404, 600, 804, 904, 1004, and/or 1104) transmits DL communications 1210 (e.g., the data blocks 330 and 332, the DL communication 810, 910, 1010, and/or 1110) a UE 1202 (e.g., the UEs 115, 302, 402, 500, 802, 902, 1002, and/or 1102). The UE 1202 can transmit an individual feedback (e.g., the ACKs 340 and/or the NACKs 342) for each DL communication 1210 using similar mechanisms described above in the schemes 700-1100. For example, the UE may transmit an ACK (marked as A) in the slot S3 202 and the slot S11 202. The UE may transmit a NACK (marked as N) in the slot S5 202. The UE 1202 may transmit a HARQ feedback history report 1240 (e.g., the reports 740, 840, 940, 1040, and/or 1140) for a period 1206. The HARQ feedback history report 1240 may be transmitted in the slot S14 202. The slot 14 202 where the HARQ feedback history report 1240 is transmitted and the reporting period 1206 can be configured by the BS 1204 in a substantial similar manner as described above in the schemes 700-1100.

The BS 1204 may configure the UE 1202 with a codebook A 1260 and a codebook B 1262 for the HARQ ACK/NACK and HARQ feedback history report transmissions. The codebook A 1260 can be used for transmitting individual HARQ ACK/NACK feedbacks. The codebook B 1262 can be used for transmitting a HARQ feedback history report 1240. Each individual HARQ ACK/NACK is typically a single bit feedback indicating an ACK or a NACK. However, the HARQ feedback history report 1240 may include multiple bits. The number of bits in the report 1240 may depend on whether the scheme 700, 800, 900, 1000, or 1100 is used and/or the specific HARQ feedback history configuration configured by the BS 1204.

In an example, when using the scheme 700, where a HARQ feedback history report is associated with a reporting period (e.g., the period 702) and includes each individual HARQ ACK/NACK within the reporting period 1206, the number of bits in the HARQ feedback history report may vary depending on the reporting period 1206. In some examples, the BS 1204 may configure the UE 1202 to report decoding results in groups of transmission occasions or a subset of transmission occasions within the reporting period 1206. Accordingly, the size of the codebook B 1262 used for HARQ feedback history report transmission may vary depending on the report configuration. As an example, when the report 1240 is configured to include each individual HARQ feedback in a reporting period with ten transmission occasions (e.g., the transmission occasions 322), the size of the codebook B 1262 provide at least 10 bits of ACK/NACK communications. In general, the codebook A 1260 used for individual or instantaneous HARQ ACK/NACKs may have a smaller codebook size than the codebook B 1262. A particular HARQ ACK/NACK may be represented in the codebook A 1260 and the codebook B 1262.

In an example, the configuration for the codebook B 1260 can be dynamic. For example, the BS 1204 may dynamically indicate, in a DCI message, a duration of ACK/NACK history for reporting. Alternatively or additionally, the BS 1204 may indicate which of the transmission occasions (e.g., the transmission occasions 322) to include in the reporting. For example, for a reporting period with ten transmission occasions, the BS 1204 may request the UE 1202 to include the first, third, and eighth transmission occasions within the reporting period using a bitmap shown below:

Reporting Bitmap=[1010000100].

The selective reporting can be useful, for example, in selecting transmission occasions associated with a particular traffic type or service type, such as eMBB or URLLC. The BS 1204 can then resolve or recover missed HARQ feedback transmissions for the eMBB or the URLLC due to eMBB/URLLC collisions or any other type of transmission errors for the particular service type.

In an example, the configuration for the codebook B 1260 can be semi-static. For example, the BS 1204 may semi-statically configure the UE 1202 with a duration for the reporting via an RRC configuration or a group common DCI. The BS 1204 may configure the codebook B 1260 with a codebook size that is based on the time duration or the number of potential transmission occasions in the time duration.

In an example, the BS 1204 may indicate, in a DCI, the locations (or codewords) within the codebook A 1260 for use with actual HARQ ACK/NACK feedback back, where the remaining locations within the codebook A 1260 can be used for NACK transmissions (e.g., to represent a DTX scenario).

In some examples, the BS 1204 may configure the UE 1202 to transmit the individual HARQ ACK/NACKs and/or the HARQ feedback history report 1240 using PUCCH resources. The BS 1204 may signal the PUCCH resource for individual HARQ ACK/NACK transmission via a PDCCH DCI. The BS 1204 may signal the PUCCH resource for HARQ feedback history report transmission via an RRC configuration.

In some embodiments, when a BS (e.g., BSs 105, 304, 404, 600, 804, 904, 1004, 1104, and/or 1204) and a UE (e.g., UEs 115, 302, 402, 500, 802, 902, 1002, 1102, and/or 1202) employ the schemes 700, 800, 900, 1000, 1100, and/or 1200 for HARQ feedback history report communications, the UE may disable individual ACK/NACK feedback transmission (e.g., the ACKs 340 and/or the NACKs 342). The UE may provide the BS with ACK/NACK feedback information by transmitting a HARQ feedback history report (e.g., the HARQ feedback history reports 740, 840, 940, 1040, 1140, and/or 1240) at certain time intervals. In an example, the BS may dynamically configure the UE to enable or disable the individual ACK/NACK feedback transmission (e.g., via an RRC configuration).

Figures 13, 14:
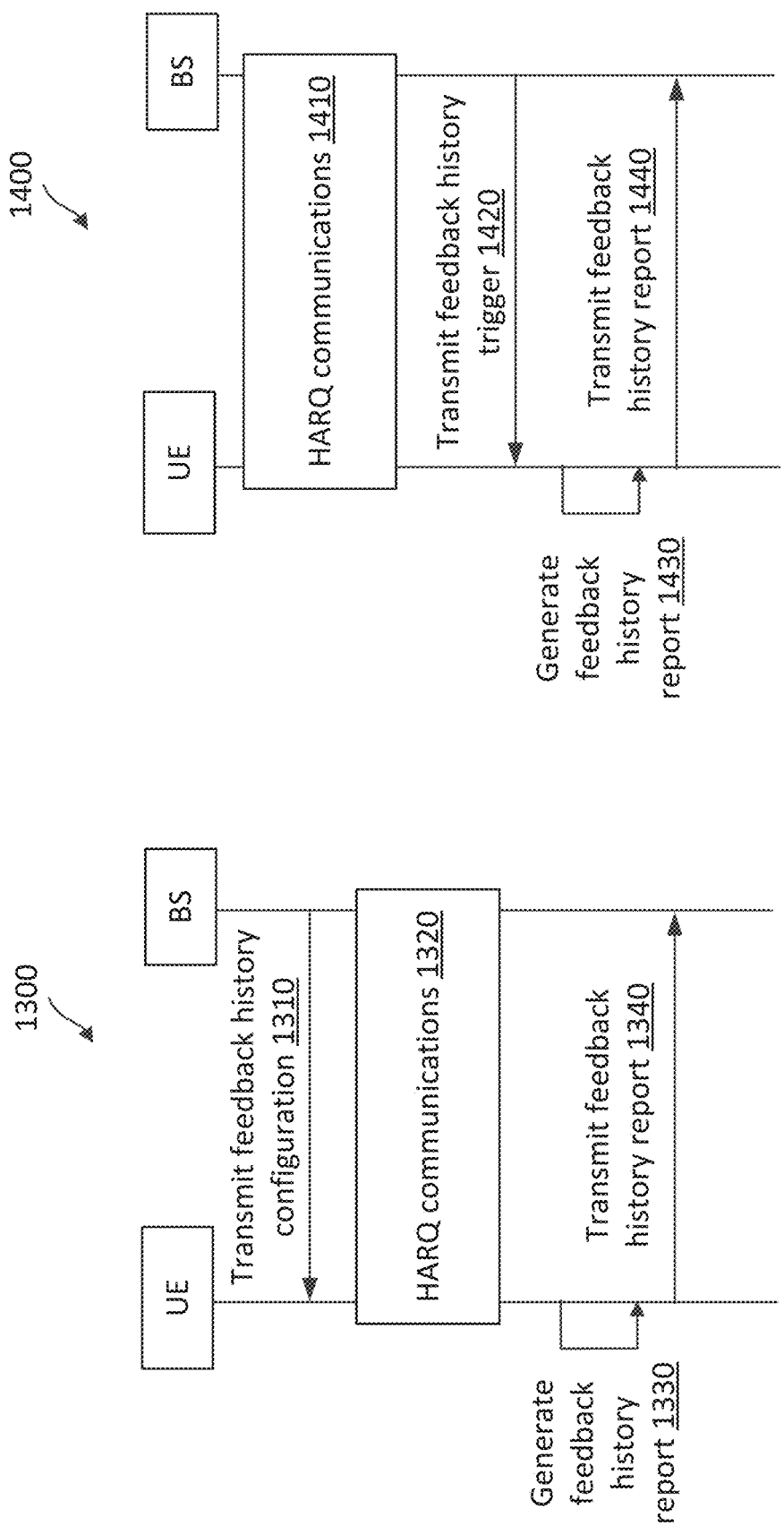
FIG. 13 is a signaling diagram illustrating a HARQ feedback history reporting method according to some embodiments of the present disclosure.
FIG. 14 is a signaling diagram illustrating a HARQ feedback history reporting method according to some embodiments of the present disclosure.

FIG. 13 is a signaling diagram illustrating a HARQ feedback history reporting method 1300 according to some embodiments of the present disclosure. The method 1300 may be implemented between a BS (e.g., BSs 105, 304, 404, 600, 804, 904, 1004, 1104, and/or 1204) and a UE (e.g., UEs 115, 302, 402, 500, 802, 902, 1002, 1102, and/or 1202). The method 1300 may employ similar mechanisms as in the schemes 700, 800, 900, 1000, 1100, and/or 1200 described above with respect to FIGS. 7, 8, 9, 10, 11, and/or 12, respectively. Steps of the method 1300 can be executed by computing devices (e.g., a processor, processing circuit, and/or other suitable component) of the BS and the UE. In an example, the BS may utilize one or more components, such as the processor 602, the memory 604, the HARQ module 608, the transceiver 610, the modem 612, and the one or more antennas 616, to execute the steps of method 1300. The UE may utilize one or more components, such as the processor 502, the memory 504, the HARQ module 508, the transceiver 510, the modem 512, and the one or more antennas 516, to execute the steps of method 1300. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the BS transmits a feedback history configuration to the UE. The configuration may be a semi-static configuration for configuring and/or transmitting a HARQ feedback history report (e.g., the reports 740, 840, 940, 1040, 1140, and/or 1240). The configuration can be an RRC configuration. The configuration may include a HARQ feedback history reporting periodicity (e.g., the period 702 and 1206), a codebook (e.g., the codebook B 1262) for transmitting the report. In some examples, the configuration may indicate which of the transmission occasions within the reporting period to be included in the report. In some examples, the configuration may request the report to be on a per component carrier basis, a per TRP basis, a per traffic or service basis, and/or per HARQ process basis. In some examples, the configuration may request the report for a certain component carrier (e.g., the component carriers C1 806 or C2 808), a certain TRP (e.g., the BS 904a, 904b, or 904c), a certain traffic type or service (e.g., eMBB or URLLC), and/or a certain HARQ process (e.g., the HARQ process 312). In some examples, the configuration may request the report to indicate an accumulation of decoding results (e.g., the results 820, 920, and/or 1020) or aggregated decoding result (e.g., the results 830, 930, and/or 1030) in various forms, such as in percentage, fraction, an accumulation of a number of ACKs (e.g., by counting the number of ACKs), an accumulation of a number of NACKs, and/or based on a certain threshold.

In an example, the configuration can indicate a resource for transmitting the report. For example, the resource can be a resource in a PUCCH. Alternatively, the resource can be in a PUSCH channel. When the resource is in a PUSCH channel, the report can be piggyback with PUSCH data or transmitted in a MAC CE.

At step 1320, the BS communicates HARQ communications with the UE. For example, the BS can transmit a plurality of DL communications (e.g., the data blocks 330 and 332 and/or the DL communications 810, 910, 1010, 1110, and/or 1210) to the UE and the UE can provide an individual HARQ ACK/NACK (e.g., the ACKs 340 and/or the NACKs 342) for each DL communication in a similar manner as described above in the schemes 700-1100 described above.

At step 1330, the UE generates a record of feedback history. The UE may perform the step 1330 can be in concurrent with the step 1320.

At step 1340, the UE transmits a HARQ feedback history report to the BS from the generated record according to the received configuration. In an example, the UE may transmit the report periodically based on a reporting periodicity in the configuration.

In some examples, the UE may skip a HARQ feedback history occasion. In other words, the UE may not transmit a HARQ feedback history report for a particular reporting period. In an example, when the UE does not receive any PDSCH transmission during the reporting period, the UE may not transmit a HARQ feedback history report for the reporting period. In an example, when the HARQ feedback history for a reporting period includes all NACKs, the UE may not transmit a HARQ feedback history report for the reporting period. In an example, when the UE determines that no individual ACK/NACK transmission is dropped (e.g., no collision and no yielding to a higher priority traffic such as URLLC traffic), the UE may not transmit a HARQ feedback history report for the reporting period.

FIG. 14 is a signaling diagram illustrating a HARQ feedback history reporting method 1400 according to some embodiments of the present disclosure. The method 1400 may be implemented between a BS (e.g., BSs 105, 304, 404, 600, 804, 904, 1004, 1104, and/or 1204) and a UE (e.g., UEs 115, 302, 402, 500, 802, 902, 1002, 1102, and/or 1202). The method 1400 may employ similar mechanisms as in the schemes 700, 800, 900, 1000, 1100, 1200, and/or 1300 described above with respect to FIGS. 7, 8, 9, 10, 11, 12, and/or 13, respectively. Steps of the method 1400 can be executed by computing devices (e.g., a processor, processing circuit, and/or other suitable component) of the BS and the UE. In an example, the BS may utilize one or more components, such as the processor 602, the memory 604, the HARQ module 608, the transceiver 610, the modem 612, and the one or more antennas 616, to execute the steps of method 1400. The UE may utilize one or more components, such as the processor 502, the memory 504, the HARQ module 508, the transceiver 510, the modem 512, and the one or more antennas 516, to execute the steps of method 1400. As illustrated, the method 1400 includes a number of enumerated steps, but embodiments of the method 1400 may include additional steps before, after, and in between the enumerated steps. In some embodiments, one or more of the enumerated steps may be omitted or performed in a different order. The method 1400 may be substantially similar to the method 1300, but may use a dynamic trigger for HARQ feedback history reporting instead of a semi-static configuration as in the method 1300.

At step 1410, the BS communicates HARQ communications with the UE. For example, the BS can transmit a plurality of DL communications (e.g., the data blocks 330 and 332 and/or the DL communications 810, 910, 1010, 1110, and/or 1210) to the UE and the UE can provide an individual HARQ ACK/NACK (e.g., the ACKs 340 and/or the NACKs 342) for each DL communication in a similar manner as described above in the schemes 700-1100 described above.

At step 1420, the BS transmits a feedback history trigger to request a HARQ feedback history report (e.g., the reports 740, 840, 940, 1040, 1140, and/or 1240) from the UE. The trigger is a dynamic trigger. For example, the BS may transmit the trigger in a slot (e.g., the slots 202) requesting a report for the past ten transmission occasions or since a last trigger and may request the report to be sent in the same slot or in a next slot. The trigger can be transmitted via a PDCCH DCI message. The trigger can be included in a DL scheduling grant or a UL scheduling grant. When the trigger is included in a DL scheduling grant, the trigger may indicate a PUCCH resource for transmitting the report. When the trigger is included in a UL scheduling grant (e.g., indicating a PUSCH resource for PUSCH transmission), the report can be transmitted using the PUSCH resource (e.g., piggyback on the PUSCH resource).

In some examples, the trigger can be transmitted in a group common DCI. The group common DCI may be configured for a group of UEs. In such examples, the UE may periodically monitor a group common DCI, for example, based on a certain time duration associated with a reporting periodicity. The inclusion of the trigger in a group common DCI can provide several benefits. For example, the signaling group common DCI instead of UE-specific DCI can reduce network signaling overhead. Additionally, the trigger may impact the existing scheduling DCI message structure.

The trigger can include a report configuration similar to the report configuration described above in the method 1300. In an example, the trigger can indicate a codebook (e.g., the codebook B 1262) for HARQ feedback history report transmission. With the dynamic trigger, the BS has the flexibility to select a different codebook for a certain HARQ feedback history report transmission.

Figure 15:
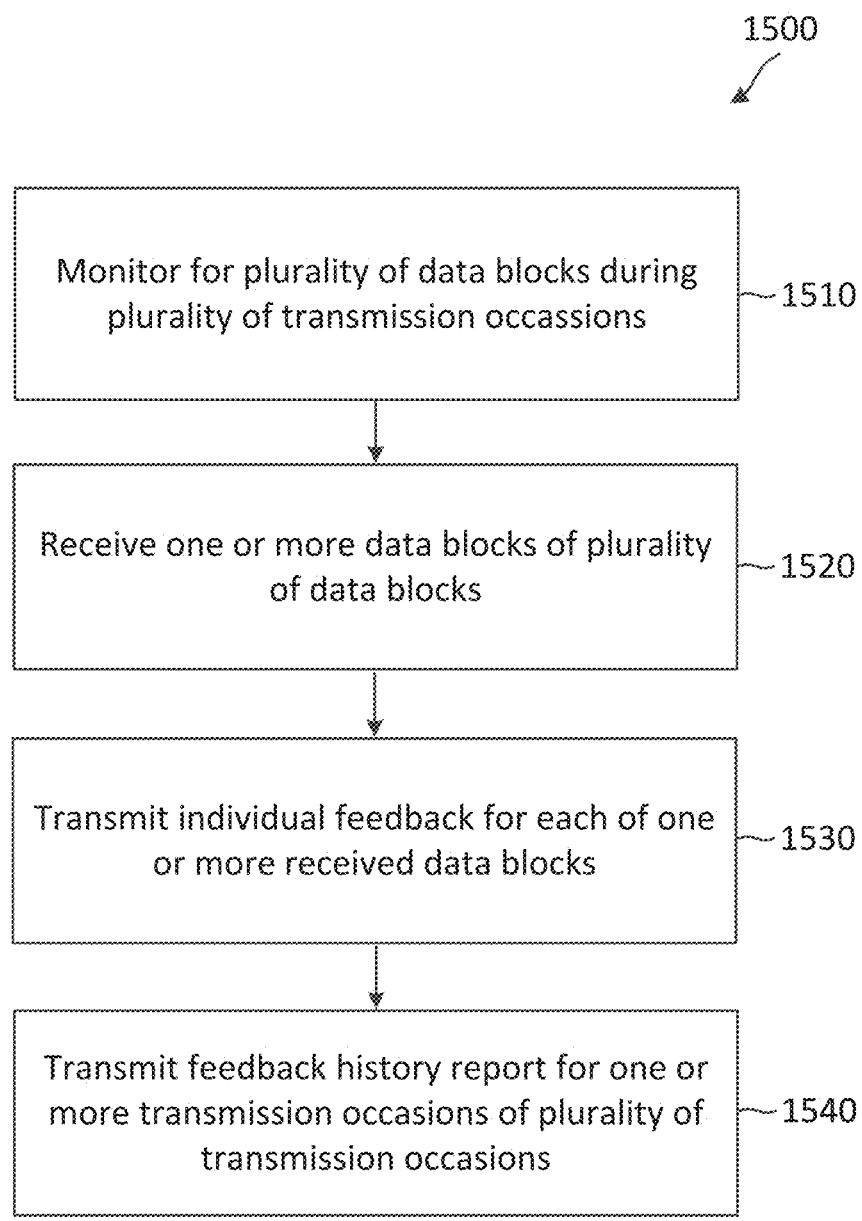
FIG. 15 is a flow diagram of a communication method according to some embodiments of the present disclosure.

FIG. 15 is a flow diagram of a communication method 1500 according to some embodiments of the present disclosure. Steps of the method 1500 can be executed by a computing device (e.g., a processor, processing circuit, and/or other suitable component) of a wireless communication device or other suitable means for performing the steps. For example, a wireless communication device, such as the UE 115, UE 302, UE 402, UE 500, UE 802, UE 902, UE 1002, UE 1102, UE 1202, may utilize one or more components, such as the processor 502, the memory 504, the HARQ module 508, the transceiver 510, the modem 512, and the one or more antennas 516, to execute the steps of method 1500. The method 1500 may employ similar mechanisms as in the schemes 700, 800, 900, 1000, 1100, and/or 1200 described above with respect to FIGS. 7, 8, 9, 10, 11, and/or 12, respectively, and/or the methods 1300 and/or 1400 described above with respect to FIGS. 13, and/or 14, respectively. As illustrated, the method 1500 includes a number of enumerated steps, but embodiments of the method 1500 include additional steps before, after, and in between the enumerated steps. In some embodiments, one or more of the enumerated steps may be omitted or performed in a different order.

At step 1510, the method 1500 includes monitoring, by a UE, for a plurality of data blocks (e.g., the data blocks 330 and 332 and/or the DL communications 810, 910, 1010, 1110, and/or 1210) during a plurality of transmission occasions (e.g., the transmission occasions 322).

At step 1520, the method 1500 includes receiving, by the UE, one or more data blocks of the plurality of data blocks, each of the one or more data blocks received in one of the plurality transmission occasions.

At step 1530, the method 1500 includes transmitting, by the UE, an individual feedback (e.g., ACK 340 or NACK 342) for each of the one or more data blocks indicating whether the data block is received successfully.

At step 1540, the method 1500 includes transmitting, by the UE, a feedback history report (e.g., the HARQ feedback history reports 740, 840, 940, 1040, 1140, and/or 1240) for one or more transmission occasions of the plurality of transmission occasions.

In an embodiment, the UE generates a NACK for each transmission occasion of the plurality of transmission occasions when no data block is received for the transmission occasion (e.g., a DTX scenario). The UE generates a record (e.g., the record 710) of feedback history for a time period (e.g., the time period 702) including the plurality of transmission occasions. The record of feedback history may include the NACK and the individual feedbacks for the received data blocks. In some embodiments, the step 1530 may be optional. For example, the UE may be configured to disable individual feedback transmission. Each individual feedback may include an ACK or a NACK. In an embodiment, the feedback history report includes the record of feedback history for the time period. In an embodiment, the UE receives a configuration indicating which of the plurality transmission occasions to include in the feedback history report, where the feedback history report is transmitted based on the configuration. In an embodiment, the feedback history report is based on at least one of an accumulation of a number of the ACKs in the record of feedback history, an accumulation of a number of the NACKs in the record of feedback history, or an aggregated result based on the number of the ACKs and the number of the NACKs. For example, the feedback history report includes an aggregated decoding result (e.g., the aggregated decoding results 830, 930, and/or 1030) for the plurality of occasions.

In an embodiment, the UE monitors for the plurality of data blocks in a plurality of component carriers (e.g., the component carriers 806 and 808) associated with the plurality of transmission occasions. In an embodiment, the UE receives a configuration for configuring the feedback history report based on a first component carrier of the plurality of component carriers, where the feedback history report is transmitted based on the configuration.

In an embodiment, the UE monitors for the plurality of data blocks from a plurality of (TRPs) (e.g., the BSs 904*a*, 904*b*, and 904*c*) associated with the plurality of transmission occasions. In an embodiment, the UE receives a configuration for configuring the feedback history report based on a first TRP of the plurality of TRPs, where the feedback history report is transmitted based on the configuration.

In an embodiment, the UE monitors the plurality of data blocks during the plurality of transmission occasions associated with a plurality of services. In an embodiment, the plurality of services includes a URLLC service and an eMBB service. In an embodiment, the UE receives a configuration for configuring the feedback history report based on a first service of the plurality of services, where the feedback history report is transmitted based on the configuration.

In an embodiment, the UE receives a first data block of the one or more data blocks, the first data block associated with a first HARQ process (e.g., the HARQ processes 312). The UE receives a second data block of the one or more data blocks, the first data block associated with a second HARQ process different from the first HARQ process. The UE includes, in the feedback history report, first feedback history information for the first HARQ process and second feedback history information for the second HARQ process.

In an embodiment, the individual feedback is transmitted based on a first codebook (e.g., the codebook A 1260) and the feedback history report is transmitted based on a second codebook (e.g., the codebook B 1262) different from the first codebook.

In an embodiment, the UE receives at least one of a RRC configuration indicating a periodicity for the feedback history report or a DCI message requesting for the feedback history report. In an embodiment, the UE receives a RRC configuration indicating a PUCCH resource for the UE to transmit the feedback history report (e.g., via a MAC CE) or a PUSCH resource for the UE to transmit the feedback history report (e.g., via piggyback with PUSCH data). In an embodiment, the UE receives a DCI message indicating a PUCCH resource for the UE to transmit the feedback history report (e.g., via a MAC CE) or a PUSCH resource for the UE to transmit the feedback history report (e.g., via piggyback with PUSCH data).

In an embodiment, the one or more data blocks are associated with at least one a PDSCH or a PUCCH.

Figure 16:
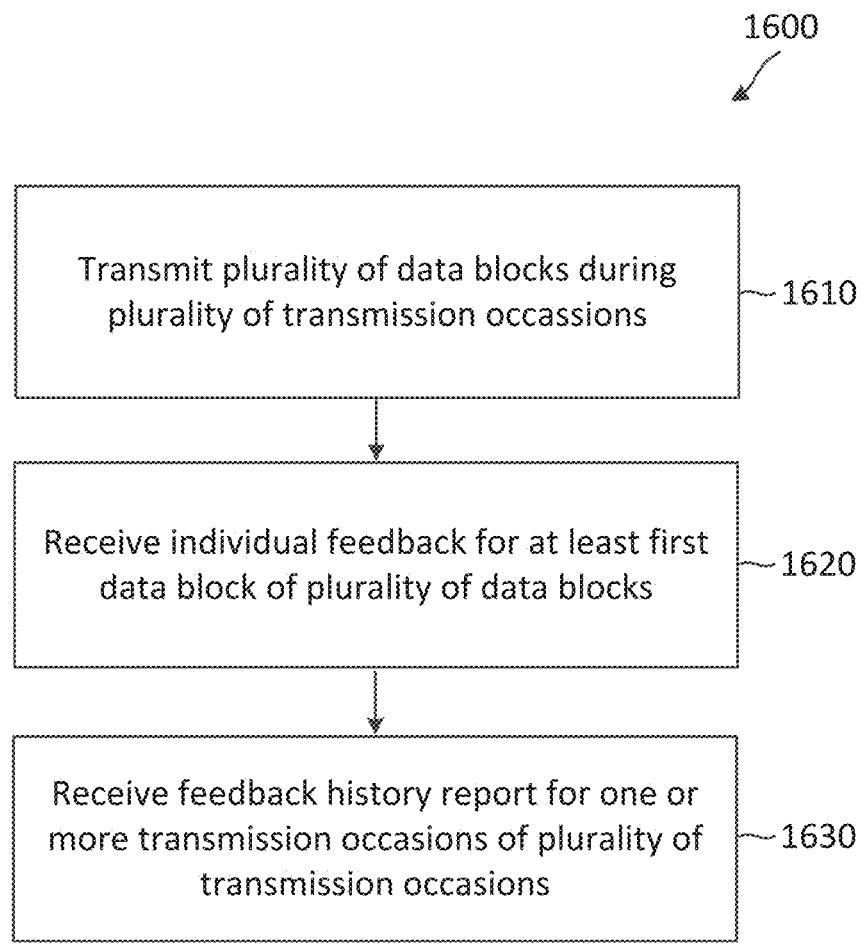
FIG. 16 is a flow diagram of a communication method according to some embodiments of the present disclosure.

FIG. 16 is a flow diagram of a communication method 1600 according to some embodiments of the present disclosure. Steps of the method 1600 can be executed by a computing device (e.g., a processor, processing circuit, and/or other suitable component) of a wireless communication device or other suitable means for performing the steps. For example, a wireless communication device, such as the BS 105, BS 304, BS 404, BS 600, BS 804, BS 904, BS 1004, BS 1104, and/or BS 1204, may utilize one or more components, such as the processor 602, the memory 604, the HARQ module 608, the transceiver 610, the modem 612, and the one or more antennas 616, to execute the steps of method 1600. The method 1600 may employ similar mechanisms as in the schemes 700, 800, 900, 1000, 1100, and/or 1200 described above with respect to FIGS. 7, 8, 9, 10, 11, and/or 12, respectively, and/or the methods 1300 and/or 1400 described above with respect to FIGS. 13, and/or 14, respectively. As illustrated, the method 1600 includes a number of enumerated steps, but embodiments of the method 1600 include additional steps before, after, and in between the enumerated steps. In some embodiments, one or more of the enumerated steps may be omitted or performed in a different order.

At step 1610, the method 1600 includes transmitting, by the BS to a UE (e.g., the UEs 115, 302, 402, 500, 802, 902, 1002, 1102, and/or 1202), a plurality of data blocks (e.g., the data blocks 330 and 332 and/or the DL communications 810, 910, 1010, 1110, and/or 1210) during a plurality of transmission occasions (e.g., the transmission occasions 322).

At step 1620, the method 1600 includes receiving, by the BS from the UE, an individual feedback (e.g., ACK 340 or NACK 342) for at least a first data block of the plurality of data blocks, the individual feedback indicating whether the first data block is received successfully.

At step 1630, the method 1600 includes receiving, by the BS from the UE, a feedback history report (e.g., the HARQ feedback history reports 740, 840, 940, 1040, 1140, and/or 1240) for one or more transmission occasions of the plurality of transmission occasions.

In an embodiment, the BS transmits, to the UE, a configuration indicating a periodicity (e.g., the time period 702 and 1206) for the feedback history report. The received feedback history includes a record (e.g., the record 710) of feedback history for a time duration that is configured based on the periodicity, the time duration including the plurality of transmission occasions.

In an embodiment, the BS transmits a configuration indicating which of the plurality of transmission occasions to include in the feedback history report.

In an embodiment, the BS transmits each of the plurality of data blocks in one of a plurality of component carriers (e.g., the component carriers 806 and 808). The BS transmits, to the UE, a configuration for configuring the feedback history report based on a first component carrier of the plurality of component carriers.

In an embodiment, the BS transmits each of the plurality of data blocks via one of a plurality of TRPs (e.g., the BSs 904a, 904b, and 904c) associated with the BS. The BS transmits, to the UE, a configuration for configuring the feedback history report based on a first TRP of the plurality of TRPs.

In an embodiment, the BS transmits each of the plurality of data blocks associated with one of a plurality of services (e.g., URLLC or eMBB). The BS transmits, to the UE a configuration based on a first service of the plurality of services for the feedback history report.

In an embodiment, the BS transmits each of the plurality of data blocks associated with one of a plurality of HARQ processes (e.g., the HARQ processes 312). The BS transmits, to the UE, a configuration for configuring the feedback history report based on a first HARQ process of the plurality of HARQ processes.

In an embodiment, the BS transmits at least one of a RRC configuration message indicating a periodicity for the feedback history report or a DCI message requesting for the feedback history report. In an embodiment, the BS transmits a RRC configuration message indicating a PUCCH resource for the UE to transmit the feedback history report (e.g., via a MAC CE) or a PUSCH resource for the UE to transmit the feedback history report (e.g., via piggyback with PUSCH data). In an embodiment, the BS transmits a DCI message indicating a PUCCH resource for the UE to transmit the feedback history report (e.g., via a MAC CE) or a PUSCH resource for the UE to transmit the feedback history report (e.g., via piggyback with PUSCH data). In an embodiment, the BS transmits a RRC configuration indicating a first codebook for the individual feedback and a second codebook for the feedback history report, the first codebook being different from the second codebook.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a base station (BS), one or more data blocks, wherein the one or more data blocks are associated with a plurality of hybrid automatic repeat request (HARQ) processes; and
   transmitting, to the BS, a feedback report for the plurality of HARQ processes, wherein the feedback report is based on an individual feedback for each of the one or more data blocks associated with the plurality of HARQ processes.

2. The method of claim 1, further comprising:
   receiving, from the BS, a request for the feedback report.

3. The method of claim 2, wherein the receiving the request for the feedback report comprises receiving the request for the feedback report via a downlink control information (DCI) message.

4. The method of claim 1, wherein the feedback report includes a most recent HARQ acknowledgment/negative acknowledgement (ACK/NACK) information for each of the one or more data blocks.

5. The method of claim 4, wherein:
   the feedback report includes a most recent HARQ ACK/NACK information for each of the plurality of HARQ processes.

6. The method of claim 5, wherein the plurality of HARQ processes comprises all HARQ processes on one or multiple serving cells.

7. The method of claim 1, wherein the feedback report is associated with a single serving cell.

8. The method of claim 1, wherein the feedback report is associated with multiple serving cells.

9. The method of claim 1, wherein the feedback report comprises the individual feedback for each of the one or more data blocks.

10. The method of claim 9, wherein the individual feedback is a single bit.

11. The method of claim 1, further comprising:
    receiving, from the BS, an indication of a first codebook associated with the feedback report.

12. The method of claim 11, further comprising:
    receiving, from the BS, an indication of a second codebook associated with individual feedbacks, wherein the second codebook is different than the first codebook.

13. The method of claim 11, wherein the receiving the indication of the first codebook comprises receiving the indication of the first codebook via a radio resource control (RRC) configuration.

14. The method of claim 11, wherein the transmitting the feedback report comprises transmitting the feedback report using the first codebook.

15. The method of claim 1, wherein the transmitting the feedback report comprises transmitting the feedback report via a physical uplink control channel (PUCCH) resource.

16. The method of claim 15, further comprising:
    receiving, from the BS, an indication of the PUCCH resource.

17. The method of claim 1, wherein the transmitting the feedback report comprises transmitting the feedback report via a physical uplink shared channel (PUSCH) resource.

18. The method of claim 17, further comprising:
    receiving, from the BS, an indication of the PUSCH resource.

19. The method of claim 1, further comprising:
    transmitting, to the BS, the individual feedback for at least one of the one or more data blocks.

20. The method of claim 19, wherein the transmitting the individual feedback for at least one of the one or more data blocks comprises transmitting the individual feedback for multiple data blocks of the one or more data blocks.

21. A method of wireless communication performed by a base station (BS), the method comprising:
    transmitting, to a user equipment (UE), one or more data blocks, wherein the one or more data blocks are associated with a plurality of hybrid automatic repeat request (HARQ) processes; and
    receiving, from the UE, a feedback report for the plurality of HARQ processes, wherein the feedback report is based on an individual feedback for each of the one or more data blocks associated with the plurality of HARQ processes.

22. The method of claim 21, further comprising:
    transmitting, to the UE, a request for the feedback report.

23. The method of claim 22, wherein the transmitting the request for the feedback report comprises transmitting the request for the feedback report via a downlink control information (DCI) message.

24. The method of claim 21, wherein the feedback report includes a most recent HARQ acknowledgment/negative acknowledgement (ACK/NACK) information for each of the one or more data blocks.

25. The method of claim 24, wherein:
the feedback report includes a most recent HARQ ACK/NACK information for each of the plurality of HARQ processes.

26. The method of claim 25, wherein the plurality of HARQ processes comprises all HARQ processes on one or multiple serving cells.

27. The method of claim 21, further comprising:
transmitting, to the UE, an indication of a first codebook associated with the feedback report.

28. The method of claim 27, further comprising:
transmitting, to the UE, an indication of a second codebook associated with individual feedbacks, wherein the second codebook is different than the first codebook.

29. The method of claim 27, wherein the transmitting the indication of the first codebook comprises transmitting the indication of the first codebook via a radio resource control (RRC) configuration.

30. The method of claim 21, wherein the receiving the feedback report comprises receiving the feedback report via a physical uplink control channel (PUCCH) resource; and further comprising:
transmitting, to the UE, an indication of the PUCCH resource.

31. The method of claim 21, wherein the receiving the feedback report comprises receiving the feedback report via a physical uplink shared channel (PUSCH) resource; and further comprising:
transmitting, to the UE, an indication of the PUSCH resource.

32. The method of claim 21, further comprising:
receiving, from the UE, the individual feedback for at least one of the one or more data blocks.

33. A user equipment (UE), comprising:
a memory;
a transceiver; and
at least one processor coupled to the memory and the transceiver, wherein the UE is configured to:
receive, from a base station (BS), one or more data blocks, wherein the one or more data blocks are associated with a plurality of hybrid automatic repeat request (HARQ) processes; and
transmit, to the BS, a feedback report for the plurality of HARQ processes, wherein the feedback report is based on an individual feedback for each of the one or more data blocks associated with the plurality of HARQ processes.

34. The UE of claim 33, wherein the UE is further configured to:
receive, from the BS, a request for the feedback report via a downlink control information (DCI) message.

35. The UE of claim 33, wherein the feedback report includes a most recent HARQ ACK/NACK information for each of the plurality of HARQ processes.

36. The UE of claim 35, wherein the plurality of HARQ processes comprises all HARQ processes on one or multiple serving cells.

37. The UE of claim 33, wherein the feedback report comprises the individual feedback for each of the one or more data blocks, wherein the individual feedback is a single bit.

38. The UE of claim 33, wherein the UE is further configured to:
receive, from the BS, an indication of a first codebook associated with the feedback report; and
receive, from the BS, an indication of a second codebook associated with individual feedbacks, wherein the second codebook is different than the first codebook; and
wherein the UE is configured to transmit the feedback report using the first codebook.

39. A base station (BS), comprising:
a memory;
a transceiver; and
at least one processor coupled to the memory and the transceiver, wherein the BS is configured to:
transmit, to a user equipment (UE), one or more data blocks, wherein the one or more data blocks are associated with a plurality of hybrid automatic repeat request (HARQ) processes; and
receive, from the UE, a feedback report for the plurality of HARQ processes, wherein the feedback report is based on an individual feedback for each of the one or more data blocks associated with the plurality of HARQ processes.

40. The BS of claim 39, wherein the BS is further configured to:
transmit, to the UE, a request for the feedback report via a downlink control information (DCI) message.

41. The BS of claim 39, wherein the feedback report includes a most recent HARQ ACK/NACK information for each of the plurality of HARQ processes.

42. The BS of claim 41, wherein the plurality of HARQ processes comprises all HARQ processes on one or multiple serving cells.

43. The BS of claim 39, wherein the BS is further configured to:
transmit, to the UE, an indication of a first codebook associated with the feedback report; and
transmit, to the UE, an indication of a second codebook associated with individual feedbacks, wherein the second codebook is different than the first codebook.

44. The BS of claim 39, wherein BS is further configured to:
transmit, to the UE, an indication of a physical uplink control channel (PUCCH) resource; and
wherein the BS is configured to receive the feedback report via the PUCCH resource.

45. The BS of claim 39, wherein BS is further configured to:
transmit, to the UE, an indication of a physical uplink shared channel (PUSCH) resource; and
wherein the BS is configured to receive the feedback report via the PUSCH resource.

* * * * *